US009876255B2

(12) United States Patent
Wessells et al.

(10) Patent No.: US 9,876,255 B2
(45) Date of Patent: Jan. 23, 2018

(54) COSOLVENT ELECTROLYTES FOR ELECTROCHEMICAL DEVICES

(71) Applicant: Alveo Energy, Inc., Palo Alto, CA (US)

(72) Inventors: Colin Deane Wessells, Palo Alto, CA (US); Ali Firouzi, Saratoga, CA (US); Shahrokh Motallebi, Los Gatos, CA (US); Sven Strohband, Menlo Park, CA (US)

(73) Assignee: Natron Energy, Inc., Santa Clara, CA (US)

( * ) Notice: Subject to any disclaimer, the term of this patent is extended or adjusted under 35 U.S.C. 154(b) by 0 days.

(21) Appl. No.: 15/013,922

(22) Filed: Feb. 2, 2016

(65) Prior Publication Data

US 2016/0156023 A1 Jun. 2, 2016

Related U.S. Application Data

(62) Division of application No. 14/231,571, filed on Mar. 31, 2014, now Pat. No. 9,287,589.

(60) Provisional application No. 61/810,684, filed on Apr. 10, 2013.

(51) Int. Cl.
*H01M 10/44* (2006.01)
*H01M 10/0569* (2010.01)
*H01M 4/58* (2010.01)
*H01M 10/36* (2010.01)
*H01M 4/36* (2006.01)
*H01M 4/60* (2006.01)
*H01M 4/90* (2006.01)
*H01M 8/18* (2006.01)
*H01M 10/08* (2006.01)
*H01M 10/34* (2006.01)
*H01M 4/485* (2010.01)
*H01M 4/505* (2010.01)
*H01M 10/0568* (2010.01)
*H01M 4/02* (2006.01)

(52) U.S. Cl.
CPC ......... *H01M 10/0569* (2013.01); *H01M 4/36* (2013.01); *H01M 4/485* (2013.01); *H01M 4/505* (2013.01); *H01M 4/58* (2013.01); *H01M 4/60* (2013.01); *H01M 4/9008* (2013.01); *H01M 8/188* (2013.01); *H01M 10/0568* (2013.01); *H01M 10/08* (2013.01); *H01M 10/345* (2013.01); *H01M 10/36* (2013.01); *H01M 2004/027* (2013.01); *H01M 2220/10* (2013.01); *H01M 2220/20* (2013.01); *H01M 2250/10* (2013.01); *H01M 2250/20* (2013.01); *H01M 2300/0002* (2013.01); *H01M 2300/004* (2013.01); *H01M 2300/0025* (2013.01); *H01M 2300/0028* (2013.01); *H01M 2300/0037* (2013.01); *H01M 2300/0091* (2013.01); *Y02B 90/14* (2013.01); *Y02T 90/32* (2013.01)

(58) Field of Classification Search
CPC ...... H01M 2/166; H01M 2/1653; H01M 2/18; H01M 2/145; H01M 2/1686; H01M 2/1646; H01M 2/1673; H01M 10/052; H01M 10/0569; H01M 10/0568; H01G 9/0029; Y01T 29/417; Y01T 29/49108
USPC ........................ 429/144, 207, 516, 246, 620; 29/623.1–623.5
See application file for complete search history.

(56) References Cited

U.S. PATENT DOCUMENTS

| | | | |
|---|---|---|---|
| 5,869,207 A | 2/1999 | Saidi et al. | |
| 6,277,525 B1 | 8/2001 | Yamamoto et al. | |
| 6,924,061 B1 | 8/2005 | Jow et al. | |
| 8,308,971 B1 | 11/2012 | Bhat et al. | |
| 9,123,966 B2 | 9/2015 | Wessells et al. | |
| 9,130,234 B2 | 9/2015 | Wessells et al. | |
| 9,287,589 B2 | 3/2016 | Wessells et al. | |
| 2007/0117007 A1 | 5/2007 | Visco et al. | |
| 2009/0007961 A1 | 1/2009 | Morooka | |
| 2009/0035662 A1 | 2/2009 | Scott et al. | |
| 2009/0087742 A1 | 4/2009 | Martinet et al. | |
| 2009/0280410 A1 | 11/2009 | Zaguib et al. | |
| 2010/0216019 A1 | 8/2010 | Morishima | |
| 2010/0221596 A1 | 9/2010 | Huggins et al. | |
| 2012/0214047 A1 | 8/2012 | Kwak et al. | |
| 2012/0328936 A1* | 12/2012 | Wessells | H01M 10/054 429/188 |
| 2013/0052538 A1 | 2/2013 | Pasta et al. | |

(Continued)

FOREIGN PATENT DOCUMENTS

CN 102522553 A 6/2012
EP 86555 A1 8/1983
(Continued)

OTHER PUBLICATIONS

ThoughtCo. (2017; https://www.thoughtco.com/definition-of-aqueous-605823).*
Dictionary.com (2017; http://www.dictionary.com/browse/aqueous).*
Asakura, D., et al. Fabrication of a Cyanide-Bridged Coordination Polymer Electrode for Enhanced Electrochemical Ion Storage Ability. J. Phys. Chem. C, 116, 8364 (2012).
Bellomo, A. Formation of Copper(II), Zinc(I), Silver(I), and Lead(II) Ferrocyanides. Talanta, 17, 1109 (1970).
Buser, H. J., et al. The Crystal Structure of Prussian Blue: Fe4[Fe(CN)6]3—xH2O. Inorg. Chem., 16, 2704 (1977).
Casado, J., et al. Photogalvanic Behavior of K3Mn(CN)6 in CN-Aqueous Solutions. Electrochim. Acta., 35, 427 (1990).

(Continued)

*Primary Examiner* — Sarah A Slifka
*Assistant Examiner* — Claire L Roe
(74) *Attorney, Agent, or Firm* — Patent Law Offices Michael E. Woods; Michael E. Woods

(57) ABSTRACT

A method for stabilizing electrodes against dissolution and/or hydrolysis including use of cosolvents in liquid electrolyte batteries for three purposes: the extension of the calendar and cycle life time of electrodes that are partially soluble in liquid electrolytes, the purpose of limiting the rate of (Continued)

electrolysis of water into hydrogen and oxygen as a side reaction during battery operation, and for the purpose of cost reduction.

4 Claims, 16 Drawing Sheets

(56) References Cited

U.S. PATENT DOCUMENTS

2013/0224632 A1 8/2013 Roumi
2013/0260232 A1 10/2013 Lu et al.

FOREIGN PATENT DOCUMENTS

| EP | 0131392 A1 | 1/1985 |
|---|---|---|
| WO | 2012177932 A2 | 12/2012 |
| WO | 2013032567 A1 | 3/2013 |
| WO | 2013157660 A1 | 10/2013 |

OTHER PUBLICATIONS

Catala, L., et al. Core-Multishell Magnetic Coordination Nanoparticles: Toward Multifunctionality on the Nanoscale. Angew. Chem. Int. Ed., 121, 189 (2009).
Clauss, V. D., et al. Über Hexacyanomanganate(I) und Hexacyanorenat(I), Z. Anorg. Allg. Chem., 297, 300 (1958).
Colin D. Wessells et al: "The Effect of Insertion Species on Nanostructured Open Framework Hexacyanoferrate Battery Electrodes", Journal of the Electrochemical Society, vol. 159, No. 2, Jan. 1, 2012 (Jan. 1, 2012 ), p. A98, XP055092033, ISSN: 0013-4651, DOI: 10.1149/2.060202jes.
Eftekhari, A. Fabrication of all-solid-state thin-film secondary cells using hexacyanometalate-based electrode materials. J. Power Sources, 132, 291 (2004).
Grabner, E. W., and Kalwellis-Mohn, S. Hexacyanoferrate layers as electrodes for secondary cells. J. Appl. Electrochem., 17, 653 (1987).
Griffith, W. P. Cyanide Complexes of the Early Transition Metals (Groups IVa-VIIa). Coord. Chem. Rev., 17, 177 (1975).
Her, J.-H., et al. Anomalous Non-Prussian Blue Structures and Magnetic Ordering of K2MnII[MnII(CN)6] and Rb2MnII[MnII(CN)6]. Inorg. Chem., 49, 1524 (2010).
Honda, K. and Hayashi, H. Prussian Blue Containing Nation Composite Film as Rechareable Battery. J. Electrochem. Soc., 134, 1339 (1987).
Hongkyung Lee et al: "Sodium zinc hexacyanoferrate with a welldefined open framework as a positive electrode for sodium ion batteries", Chemical Communications, vol. 48, No. 67, Jan. 1, 2012 (Jan. 1, 2012 ), p. 8416, XP055092042, ISSN: 1359-7345, DOI: 10.1039/c2cc33771 a.
Huihui Wang et al: "One-step synthesis and self-organization of polypyrrole ultrathin films inlayed with Prussian blue nanoparticles induced by a drop of toluene solution on water surface", Thin Solid Films, Elsevier-Sequoias.A. Lausanne, CH, vol. 520, No. 6, Sep. 28, 2011 (Sep. 28, 2011), pp. 2026-2031, XP028444283, ISSN: 0040-6090, DOI: 10.1016/J.TSF.2011.09.077 [retrieved on Oct. 6, 2011].
Itaya, K., et al. Electrochemistry of Polynuclear Transition Metal Cyanides: Prussian Blue and Its Analogues. Am. Chem. Res., 19, 162 (1986).
Jayalakshmi, M., and Scholz, F. Charge-discharge characteristics of a solid-state Prussian blue secondary cell. J. Power Sources, 87, 212 (2000).
Jayalakshmi, M., and Sholz, F. Performance characteristics of zinc hexacyanoferrate/Prussian blue and copper hexacyanoferrate/Prussian blue sold state secondary cells. J. Power Sources, 91, 217 (2000).
Jianping Li et al: "Highly Sensitive Molecularly Imprinted Electrochemical Sensor Based on the Double Amplification by an Inorganic Prussian Blue Catalytic Polymer and the Enzymatic Effect of Glucose Oxidase", Analytical Chemistry, vol. 84, No. 4, Feb. 21, 2012 (Feb. 21, 2012 ), pp. 1888-1893.
Kalwellis-Mohn, S., and Grabner, E. W. A Secondary Cell Based on Thin Film Layers of Zeolite-Like Nickel Hexacyanometallates. Electrochim. Acta., 34, 1265 (1989).
Kaneko, M., and Okada, T. A secondary battery composed of multilayer Prussian Blue and its reaction characteristics. J. Electroanal. Chem., 255, 45 (1988).
Kasem K K ED—Crupi DR et al: "Electrochemkal behavior of iron-hexacyanoruthenate(II) thin films in aqueous electrolytes: potential analytical and catalytic applications", Materials Science and Engineering B, Elsevier Sequoia, Lausanne, CH, vol . 83, No. 1-3, Jun. 21, 2001 (Jun. 21, 2001), pp. 97-105.
López-Cueto, G., et al. Fast disproportionation of hexacyanomanganate(III) in acidic solution. Formation of hexacyanomanganate(IV) and kinetics of its decomposition. Can. J. Chem., 64, 2301 (1986).
M. Presle et al: Controlled growth of core@shell heterostructures.
Messina, R., and Perichon, J. Mécanisme de la réduction électrochimique en milieu non aqueux de materiaux cathodiques utilizes dan les piles au lithium. V. Utilisation des hexacyanoferrates de fer (II et III) comme materiaux cathodiques reversibles. J. Appl. Electrochem., 10, 655 (1980).
Messina, R., Perichon, J., and Broussely, M. Mécanismes de la réduction électrochimique en milieu non aqueux de materiaux cathodiques utilizes dans les piles au lithium. IV. Réduction d'électrodes membranaires d'hexacyanoferrates (II et III) d'argent dans le mélange carbonate de propylene-1,2-diméthoxyethane. J. Appl. Electrochem., 9, 677 (1979).
Neff, V. D. Some Performance Characteristics of a Prussian Blue Battery. J. Electrochem. Soc., 132, 1382 (1985).
Okubo, M., et al. Switching Redox-Active Sites by Valence Tautomerism in Prussian Blue Analaogues AxMny[Fe(CN)6]-nH2O (A: K, Rb): Robust Frameworks for Reversible Li Storage. J. Phys. Chem. Lett., 1, 2063 (2010).
Pasta, M., et al. A high-rate and long cycle life aqueous electrolyte battery for grid-scale energy storage. Nature Comm., 3, 1149 (2012).
Rastler, D. Electricity Energy Storage Technology Options, Electric Power Research Institute, 1020676 (2010).
Robin, M. B., The Color and Electronic Configurations of Prussian Blue. Inorg. Chem., 1, 337 (1962).
Scholz, F., et al. The Formal Potentials of Solid Metal Hexacyanometalates. Angew. Chem. Int. Ed. Engl., 34, 2685 (1995).
Schwochau, V. K., et al. Darstellung und Eigenschaften von Kalium-cyanotechnetat(I), Z. Anorg. Allg. Chem., 319, 148 (1962).
Shannon, R. D. Revised Effective Ionic Raddi and Systematic Studies of Interatomic Distances in Halides and Chalcogenides, Acta Cryst., A32, 751 (1976).
Soto, M. B., et al. The thermodynamics of the insertion electrochemistry of solid metal hexacyanometallates. J. Electroanal. Chem., 521, 183 (2002).
Stilwell, D. E., et al. Electrochemical studies of the factors influencing the cycle stability of Prussian Blue films. J. Appl. Electrochem., 22, 325 (1992).
Wessells, C. D., et al. Copper hexacyanoferrate battery electrodes with long cycle life and high power. Nature Comm., 2, 550 (2011).
Wessells, C. D., et al. Nickel Hexacyanoferrate Nanoparticle Electrodes for Aqueous Sodium and Potassium Ion Batteries. Nano Lett., 11, 5421 (2011).
Wessells, C. D., et al. The Effect of Insertion Species on Nanostructured Open Framework Hexacyanoferrate Battery Electrodes. J. Electrochem. Soc., 159, A98 (2012).
Wessells, C. D., et al. Tunable Reaction Potentials in Open Framework Nanoparticle Battery Electrodes for Grid-Scale Energy Storage. ACS Nano, 6, 1688 (2012).
Xiaoouan Lu et al: "A simple and an efficient strategy to synthesize multi-component nanocomposites for biosensor applications", Anal Ytica Chimica Acta, Elsevier, Amsterdam, NL, vol. 711, Nov. 2, 2011 (Nov. 2, 2011), pp. 40-45, XP028339021, ISSN: 0003-2670, DOI: 10.1016/J.ACA.2011.11.005 [retrieved on Nov. 11, 2011 ].

(56) References Cited

OTHER PUBLICATIONS

Zadronecki, M., et al. High Affinity of Thallium Ions to Copper Hexacyanoferrate Films. J. Electrochem. Soc., 148, E348, (2001).

Roman Imhof et al. "In Situ Investigation of the Electrochemical Reduction of Carbonate Electrolyte Solutions at Graphite Electrodes," J. Electrochem. Soc., vol. 145, No. 4, (Apr. 1998).

Roman Imhof et al. "In Situ Investigation of the Electrochemical Reduction of Carbonate Electrolyte Solutions at Graphite Electrodes," J. Electrochem. Soc., vol. 145, No. 4, Apr. 1998.

Hiroshi Senoh et al., "Sulfone-Based Electrolyte Solutions for Rechargeable Magnesium Batteries Using 2,5-Dimethoxy-1,4-benzoquinone Positive Electrode," J. Electrochem. Soc. vol. 161 (9) A1315-A1320 (2014).

Hiroshi Senor et al., "Sulfone-Based Electrolyte Solutions for Rechargeable Magnesium Batteries Using 2,5-Dimethoxy-1,4-benzoquinone Positive Electrode," J. Electrochem. Soc. 161 (9) A1315-A1320 (2014).

Yuu Watanabe et al., "Electrochemical properties and lithium ion solvation behavior of sulfone-ester mixed electrolytes for high-voltage rechargeable lithium cells," Journal of Power Sources, vol. 179, 770-779 (2008).

IUPAC-NIST Solubility Data Series. 83. Acetonitrile: Ternary and Quaternary Systems, published online Sep. 5, 2007.

Jayalakshmi, M. et al., "Electrochemical Behaviour of Prussian Blue Deposits in Presence of Some Non-Aqueous Background Solutions" Bulletin of Electrochemistry 16 (3) Mar. 2000, pp. 123-129.

Starkovich, J. A, et al., "Solubilities of some chloride and perchlorate salts in sulfolane", J. inorg. nucl. Chem, 1972 vol. 34, pp. 789-791.

Notification of the First Office Action (for PCT Applications Entering the National Phase), State Intellectual Property Office of China, Application No. 201480020748.6, Dispatched Mar. 21, 2017.

Dinh, H, et al., "Electrochemical Analysis of Conductive Polymer-Coated LiFePO4 Nanocrystalline Cathodes with Controlled Morphology" Electroanalysis 2011, 23, No. 9, 2079-2086, (C) Wiley-VCH Verlag GmbH & Co. KGaA, Weinham.

* cited by examiner

COSOLVENT ELECTROLYTES FOR ELECTROCHEMICAL DEVICES

CROSS REFERENCE TO RELATED APPLICATIONS

This application is a division of U.S. patent application Ser. No. 14/231,571 filed 31 Mar. 2014 which in turn claims benefit of U.S. patent application No. 61/810,684, the contents of these applications are hereby expressly incorporated by reference thereto in their entireties for all purposes.

STATEMENT REGARDING FEDERALLY SPONSORED RESEARCH OR DEVELOPMENT

This invention was made with government support under ARPA-E Award No. DE-AR000300 With Alveo Energy, Inc., awarded by DOE. The government has certain rights in the invention.

FIELD OF THE INVENTION

The present invention relates generally to electrochemical devices, and more specifically, but not exclusively, to cosolvent-based liquid electrolytic cells.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A wide variety of battery technologies have been developed for portable and stationary applications, including lead acid, lithium-ion, nickel/metal hydride, sodium sulfur, and flow batteries, among others. (See Reference Number 1, below.) Not one of these technologies is commonly used for applications related to the stabilization and reliability of the electric grid do to exorbitantly high cost, poor cycle and calendar lifetime, and low energy efficiency during rapid cycling. However, the development of lower cost, longer lived batteries is likely needed for the grid to remain reliable in spite of the ever-increasing deployment of extremely volatile solar and wind power.

Existing battery electrode materials cannot survive for enough deep discharge cycles for the batteries containing them to be worth their price for most applications related to the electric grid. (See Reference Number 1, below.) Similarly, the batteries found in electric and hybrid electric vehicles are long lived only in the case of careful partial discharge cycling that results in heavy, large, expensive battery systems. The performance of most existing battery electrode materials during fast cycling is limited by poor kinetics for ion transport or by complicated, multi-phase operational mechanisms.

The use of Prussian Blue analogues, which are a subset of a more general class of transition metal cyanide coordination compounds (TMCCCs) of the general chemical formula $A_xP_y[R(CN)_6]_z \cdot nH_2O$ (A=alkali cation, P and R=transition metal cations, $0 \leq x \leq 2$, $0 \leq y \leq 4$, $0 \leq z \leq 1$, $0 \leq n$), has been previously demonstrated as electrodes in aqueous electrolyte batteries. (See Reference Numbers 1-7.) TMCCC electrodes have longer deep discharge cycle life and higher rate capability than other intercalation mechanism electrodes, and they enjoy their highest performance in aqueous electrolytes. TMCCC cathodes rely on the electrochemical activity of iron in $Fe(CN)_6$ complexes at high potentials. TMCCC anodes, on the other hand, contain electrochemically active, carbon-coordinated manganese or chromium.

The development of a symmetric battery in which both the anode and the cathode are each a TMCCC is desirable because TMCCCs have longer cycle life and can operate at higher charge/discharge rates than other electrode systems. If one TMCCC electrode were to be paired with a different kind of electrode, it is likely that the full battery would not last as long, or provide the same high-rate abilities as a symmetric cell containing a TMCCC anode and a TMCCC cathode.

TMCCC cathodes are well understood, and the operation of a TMCCC cathode for over 40,000 deep discharge cycles has been previously demonstrated. (See Reference Number 2.) These cathodes typically operate at about 0.9 to 1.1 V vs. the standard hydrogen electrode (SHE). (See Reference Number 8.) One challenge for the development of practical batteries using TMCCC cathodes is their trace solubility in aqueous electrolytes. Their partial dissolution into the battery electrolyte can result in a decrease in battery charge capacity due to mass loss from the electrodes and a decrease in efficiency due to side reactions with the cathode's dissolution products.

The development of a TMCCC anode has proven much more challenging than that of TMCCC cathodes because these materials typically have reaction potentials either near 0 V or below $-0.5$ V vs. SHE, but not in the range between $-0.5$ V and 0 V that is most desirable in aqueous electrolytes, and because they operate only in a narrow pH range without rapid hydrolysis to manganese dioxide phases. (See Reference Numbers 8-9.) As the useful electrochemical stability window of aqueous electrolytes at approximately neutral pH (pH=5-8) extends from about $-0.4$ V to 1 V vs. SHE, an anode reaction potential of 0 V results in a cell voltage lower than the maximum that is possible without decomposition of water. But, in the case of an anode reaction potential below $-0.5$ V vs. SHE, the charge efficiency of the anode can be poor due to rapid hydrolysis of water to hydrogen gas. Finally, if the $Mn(CN)_6$ groups in the TMCCC anode hydrolyze, the capacity of the electrode is rapidly lost.

What is needed is a system and method for stabilizing TMCCC electrodes against dissolution and/or hydrolysis.

BRIEF SUMMARY OF THE INVENTION

Disclosed is a system and method for stabilizing electrodes against dissolution and/or hydrolysis. The following summary of the invention is provided to facilitate an understanding of some of technical features related to use of cosolvent electrolytes for more efficient and durable batteries, and is not intended to be a full description of the present invention. A full appreciation of the various aspects of the invention can be gained by taking the entire specification, claims, drawings, and abstract as a whole. The present invention is applicable to other electrode types in addition to TMCCC cathodes and/or anodes, to other electrochemical devices in addition to full, partial, and/or hybrid battery systems including a liquid electrolyte.

This patent application concerns the use of cosolvents in liquid electrolyte batteries for three purposes: the extension of the calendar and cycle life time of electrodes that are partially soluble in liquid electrolytes, the purpose of limiting the rate of electrolysis of water into hydrogen and oxygen as a side reaction during battery operation, and for the purpose of cost reduction. Cosolvents are when two liquids are combined into a single solution, as in the case of water and ethanol in wine, which may also contain dissolved compounds such as salts. Herein is demonstrated a utility of these cosolvent electrolytes using the model system of an aqueous sodium ion electrolyte battery containing TMCCC electrodes, but the benefits of cosolvents to the performance of liquid electrolyte batteries apply generally to other electrode and battery systems as well. One cost benefit occurs because an organic cosolvent as disclosed herein allows one to have a higher voltage before water is quickly split into hydrogen and oxygen. When the organic cosolvent is cheap, and the electrodes are the same materials (as in some embodiments disclosed herein when the anode has two different reaction potentials), then the organic cosolvent lets the electrochemical device have a higher voltage for about the same materials cost. Energy is equal to the product of the charge and the voltage, so a higher voltage electrochemical cell that gets more energy from the same materials will therefore have a lower cost/energy.

The present invention broadly includes a general concept of the use of cosolvents in liquid electrolyte batteries, particularly, but not exclusively, in two areas: first, the concept of using cosolvents to protect TMCCC electrodes from dissolution and/or hydrolysis, and second, the ability to use a hexacyanomanganate-based TMCCC anode with a reaction potential so low that it can only be used when reduction of water to hydrogen gas is suppressed (as is the case, for example, when a cosolvent is used as herein described).

Included herein is description of a novel method for the stabilization of TMCCC electrodes against dissolution and hydrolysis, while simultaneously suppressing hydrogen generation at the anode: the addition of a cosolvent to the aqueous electrolyte. A cosolvent electrolyte is one in which multiple liquid solvents are combined to form a single liquid phase, in which the electrolyte salt and any additional additives are then dissolved. The presence of a cosolvent can drastically change the solubility and stability of materials including both TMCCCs and electrolyte salts. The proper choice of cosolvent slows or prevents the dissolution and/or hydrolysis of TMCCC electrodes, and it allows for the high-efficiency operation of TMCCC anodes with reaction potentials below −0.5 V vs. SHE. The final result is an electrochemical device that operates at voltages of nearly double those that can be achieved in simple aqueous electrolytes, with longer electrode cycle and calendar lives.

A battery (cell) that comprises an electrolyte and two electrodes (an anode and a cathode), one or both of which is a TMCCC material of the general chemical formula $A_xP_y[R(CN)_{6-j}L_j]_z \cdot nH_2O$, where: A is a monovalent cation such as $Na^+$, $K^+$, $Li^+$, or $NH_4^+$, or a divalent cation such as $Mg^{2+}$ or $Ca^{2+}$; P is a transition metal cation such as $Ti^{3+}$, $Ti^{4+}$, $V^{2+}$, $V^{3+}$, $Cr^{2+}$, $Cr^{3+}$, $Mn^{2+}$, $Mn^{3+}$, $Fe^{2+}$, $Fe^{3+}$, $Co^{2+}$, $Co^{3+}$, $Ni^{2+}$, $Cu^+$, $Cu^{2+}$, or $Zn^{2+}$, or another metal cation such as $Al^{3+}$, $Sn^{2+}$, $In^{3+}$, or $Pb^{2+}$; R is a transition metal cation such as $V^{2+}$, $V^{3+}$, $Cr^{2+}$, $Cr^{3+}$, $Mn^+$, $Mn^{2+}$, $Mn^{3+}$, $Fe^{2+}$, $Fe^{3+}$, $Co^{2+}$, $Co^{3+}$, $Ru^{2+}$, $Ru^{3+}$, $Os^{2+}$, $Os^{3+}$, $Ir^{2+}$, $Ir^{3+}$, $Pt^{2+}$, or $Pt^{3+}$; L is a ligand that may be substituted in the place of a $CN^-$ ligand, including CO (carbonyl), NO (nitrosyl), or $Cl^-$; $0 \le x \le 2$; $0 < y \le 4$; $0 < z \le 1$; $0 \le j \le 6$; and $0 \le n \le 5$; and where the electrolyte contains water, one or more organic cosolvents, and one or more salts, where: the electrolyte is a single phase.

A rechargeable electrochemical cell, includes a positive electrode; a negative electrode; and an electrolyte having a total electrolyte volume V including a first quantity of water comprising a first fraction V1 of the total electrolyte volume V and including a second quantity of one or more organic cosolvents together comprising a second fraction V2 of the total electrolyte volume V; wherein V1/V>0.02; wherein V2>V1; wherein a particular one electrode of the electrodes includes a transition metal cyanide coordination compound (TMCCC) material; and wherein the electrolyte is a single phase.

A rechargeable electrochemical cell, includes a positive electrode; a negative electrode; and an electrolyte having a total electrolyte weight W including a first quantity of water comprising a first fraction W1 of the total electrolyte weight W and including a second quantity of one or more organic cosolvents together comprising a second fraction W2 of the total electrolyte weight W; wherein W1/W>0.02; wherein W2>W1; wherein a particular one electrode of the electrodes includes a transition metal cyanide coordination compound (TMCCC) material; and wherein the electrolyte is a single phase.

A method for operating a rechargeable electrochemical cell having a negative electrode disposed in a single phase liquid electrolyte of a total electrolyte quantity Q including at least a total quantity Q1 of water wherein Q1/Q is approximately 0.02 or greater and wherein an electrolysis of the total quantity Q1 of water below a first potential V1 initiates a production of hydrogen gas at a first rate R1, including a) exchanging ions between the negative electrode and the liquid electrolyte at an electrode potential VE, VE<V1; and b) producing hydrogen gas at a second rate R2 less than R1 responsive to the electrode potential VE; wherein an electrolysis of the total electrolyte quantity Q a second quantity of one or more organic cosolvents together comprising a second fraction Q2 of the total electrolyte quantity Q below a second potential V2 initiates the production of hydrogen gas at the first rate R1, V2<V1; and wherein VE>V2.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Figure 1:
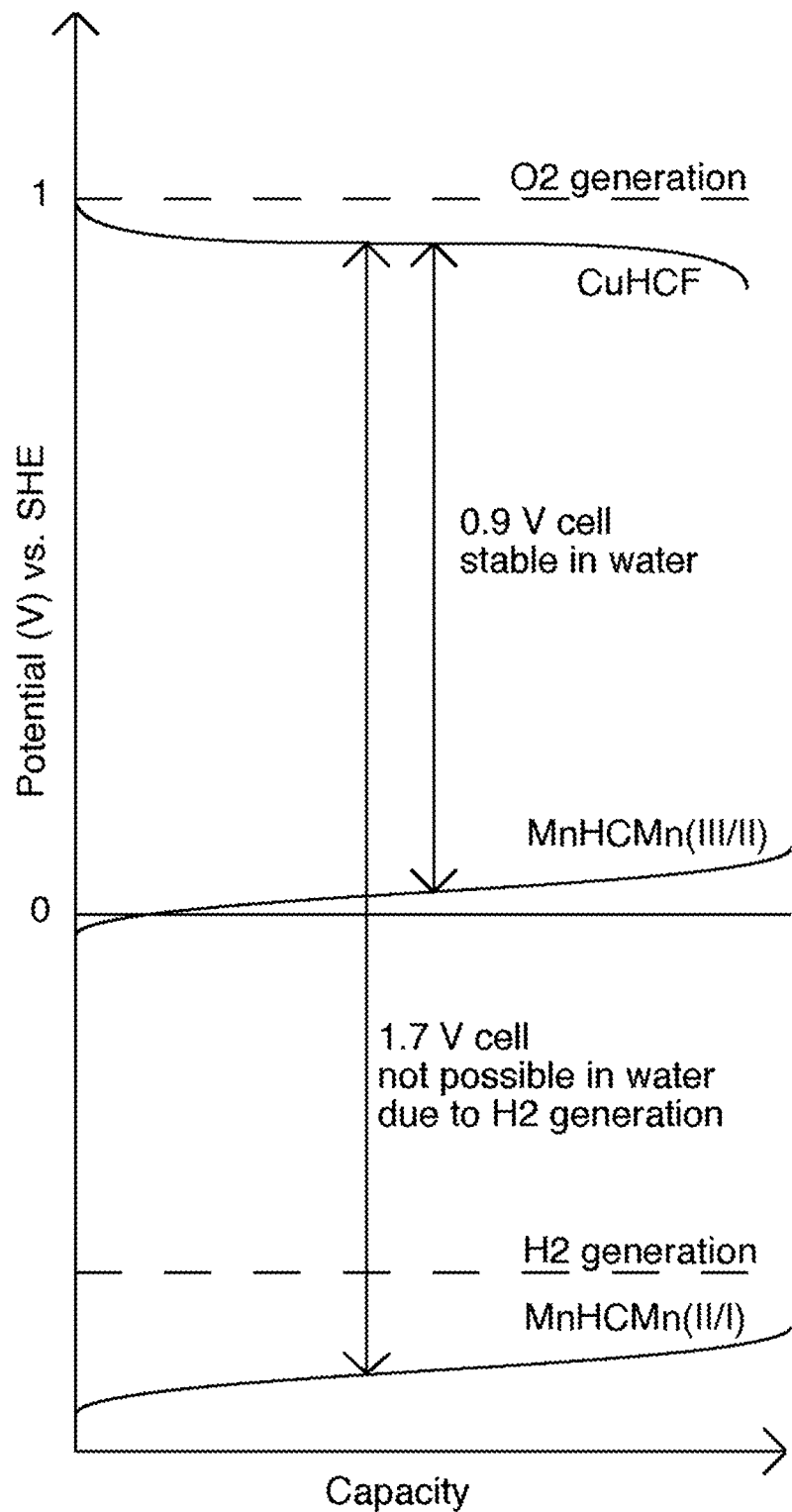
FIG. 1 illustrates a schematic of batteries using the higher and lower anode reactions for CuHCF and MnHCMn.

Embodiments of the present invention provide a system and method for stabilizing electrodes against dissolution and/or hydrolysis. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

The following definitions apply to some of the aspects described with respect to some embodiments of the invention. These definitions may likewise be expanded upon herein.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "couple," "coupled," and "coupling" refer to an operational connection or linking. Coupled objects can be directly connected to one another or can be indirectly connected to one another, such as via an intermediary set of objects.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable properties that are substantially the same as those of the non-spherical object. Thus, for example, a size of a non-spherical object can refer to a diameter of a corresponding spherical object that exhibits light scattering or other properties that are substantially the same as those of the non-spherical object. Alternatively, or in conjunction, a size of a non-spherical object can refer to an average of various orthogonal dimensions of the object. Thus, for example, a size of an object that is a spheroidal can refer to an average of a major axis and a minor axis of the object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

As used herein, the term "electrolyte" means an ion-conducting, but electronically insulating medium into which the electrodes of an electrochemical cell are disposed. A liquid electrolyte contains one or more liquid solvents and one or more salts that readily disassociate when dissolved in these solvents. Liquid electrolytes may also contain additives that enhance a performance characteristic of the electrochemical cell into which the electrolyte is disposed.

As used herein, the term "battery" means a rechargeable electrochemical device that converts stored chemical energy into electrical energy, including voltaic cells that may each include two half-cells joined together by one or more conductive liquid electrolytes.

As used herein, in the context of a cosolvent solution and a majority or primary solvent of such cosolvent solution, the term "majority" or "primary" means, for a two solvent cosolvent solution, a solvent having 50% or greater volume of the total solvent volume (% vol./vol.), or 50% or greater weight of the total solvent weight (% weight/weight). For a cosolvent solution having three or more solvents, the majority/primary solvent is the solvent present in the greatest quantity (by volume or weight) as compared to the quantities of any of the other solvents of the cosolvent solution. These determinations are preferably made before accounting for any salt or additive to the cosolvent solution. A "minority" or "secondary" solvent in a cosolvent solution is any other solvent other than the majority/primary solvent. For purposes of this present invention when considering cosolvent solutions, water is never a majority solvent and may be a minority/secondary solvent. Water is purposefully present as minority solvent in greater quantity than would be incidental or present as a contaminant having 2% or greater volume of the total solvent volume (% vol./vol.), or 2% or greater weight of the total solvent weight (% weight/weight).

Electrode Materials

Some disclosed embodiments of the invention relate to battery electrode materials in which dimensional changes in a host crystal structure during charging and discharging are small, thereby affording long cycle life and other desirable properties. Such dimensional changes can otherwise result in mechanical deformation and energy loss, as evidenced by hysteresis in battery charge/discharge curves.

Some embodiments relate to a class of transition metal cyanide complex compound (TMCCC) electrode materials having stiff open framework structures into which hydrated cations can be reversibly and rapidly intercalated from aqueous (e.g., water-based) electrolytes or other types of electrolytes. In particular, TMCCC materials having the Prussian Blue-type crystal structure afford advantages including greater durability and faster kinetics when compared to other intercalation and displacement electrode materials. A general formula for the TMCCC class of materials is given by:

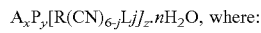

$A_xP_y[R(CN)_{6-j}L_j]_z \cdot nH_2O$, where:

A is a monovalent cation such as $Na^+$, $K^+$, $Li^+$, or $NH_4^+$, or a divalent cation such as $Mg^{2+}$ or $Ca^{2+}$;

P is a transition metal cation such as $Ti^{3+}$, $Ti^{4+}$, $V^{2+}$, $V^{3+}$, $Cr^{2+}$, $Cr^{3+}$, $Mn^{2+}$, $Mn^{3+}$, $Fe^{2+}$, $Fe^{3+}$, $Co^{2+}$, $Co^{3+}$, $Ni^{2+}$, $Cu^+$, $Cu^{2+}$, or $Zn^{2+}$, or another metal cation such as $Al^{3+}$, $Sn^{2+}$, $In^{3+}$, or $Pb^{2+}$;

R is a transition metal cation such as $V^{2+}$, $V^{3+}$, $Cr^{2+}$, $Cr^{3+}$, $Mn^+$, $Mn^{2+}$, $Mn^{3+}$, $Fe^{2+}$, $Fe^{3+}$, $Co^{2+}$, $Co^{3+}$, $Ru^{2+}$, $Ru^{3+}$, $Os^{2+}$, $Os^{3+}$, $Ir^{2+}$, $Ir^{3+}$, $Pt^{2+}$, or $Pt^{3+}$;

L is a ligand that may be substituted in the place of a $CN^-$ ligand, including CO (carbonyl), NO (nitrosyl), or $Cl^-$;

$0 \leq x \leq 2$;
$0 < y \leq 4$;
$0 < z \leq 1$;
$0 \leq j \leq 6$; and
$0 \leq n \leq 5$.

FIGURES

FIG. 1 illustrates a schematic of batteries using the higher and lower anode reactions for the MnHCMn anode and the reaction potential of the CuHCF cathode. This schematic shows the operational modes of a battery containing a TMCCC cathode and a TMCCC anode used together in two different electrolytes; 1) an aqueous electrolyte, and 2) a cosolvent electrolyte. In the aqueous electrolyte, rapid hydrogen evolution occurs above the lower operational potential of the anode, so only the upper operational potential of the anode can be used. The result is a 0.9 V cell. But, in the cosolvent electrolyte, hydrogen production is suppressed, resulting in efficient use of the lower operational potential of the anode and a full cell voltage of 1.7 V.

Figure 2:
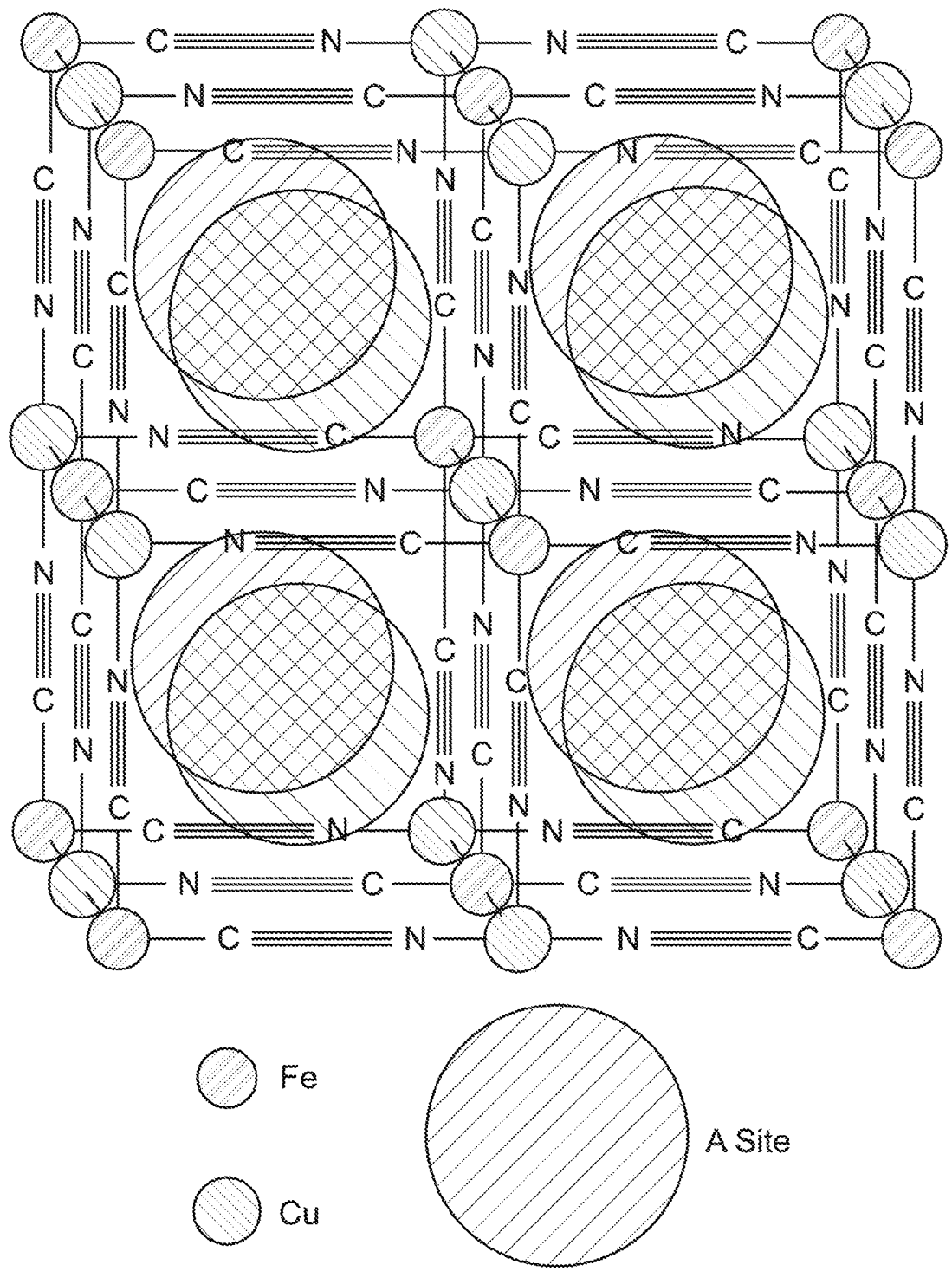
FIG. 2 illustrates a unit cell of the TMCCC crystal structure.

FIG. 2 illustrates a unit cell of the cubic Prussian Blue crystal structure, one example of a TMCCC structure. Transition metal cations are linked in a face-centered cubic framework by cyanide bridging ligands. The large, interstitiate A sites can contain water or inserted alkali ions.

Figure 3:
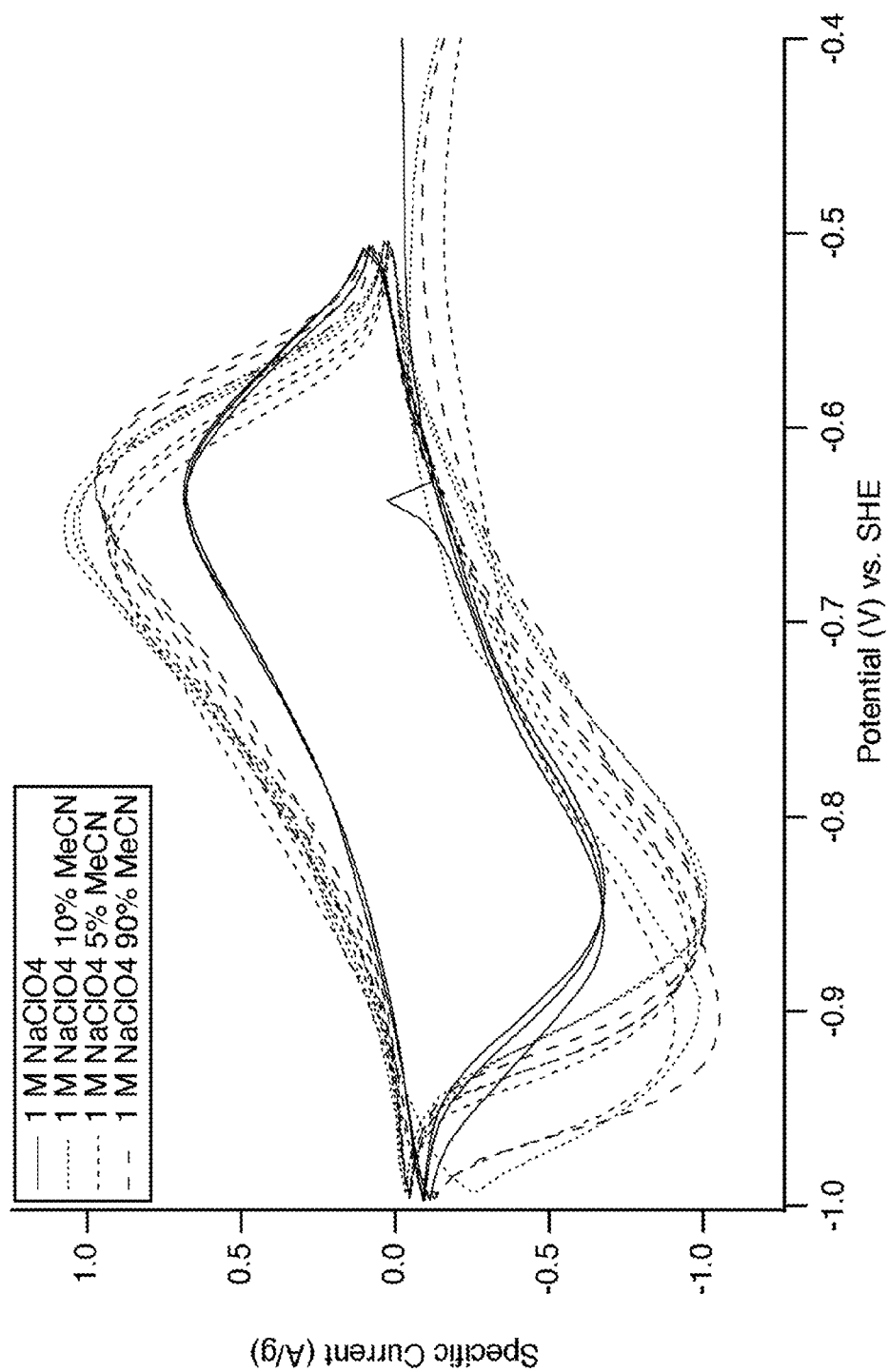
FIG. 3 illustrates a cyclic voltammogram of MnHCMn in cosolvents.

FIG. 3 illustrates a cyclic voltammogram of MnHCMn in cosolvents. Cyclic voltammetry of the lower operational potential of manganese hexacyanomanganate(II/I) is shown in aqueous 1 M $NaClO_4$ and 1 M $NaClO_4$ containing various concentrations of acetonitrile. The position and hysteresis between the current peaks vary only slightly with acetonitrile concentration, indicating that the reaction mechanism and performance is largely independent of the cosolvent.

Figure 4:
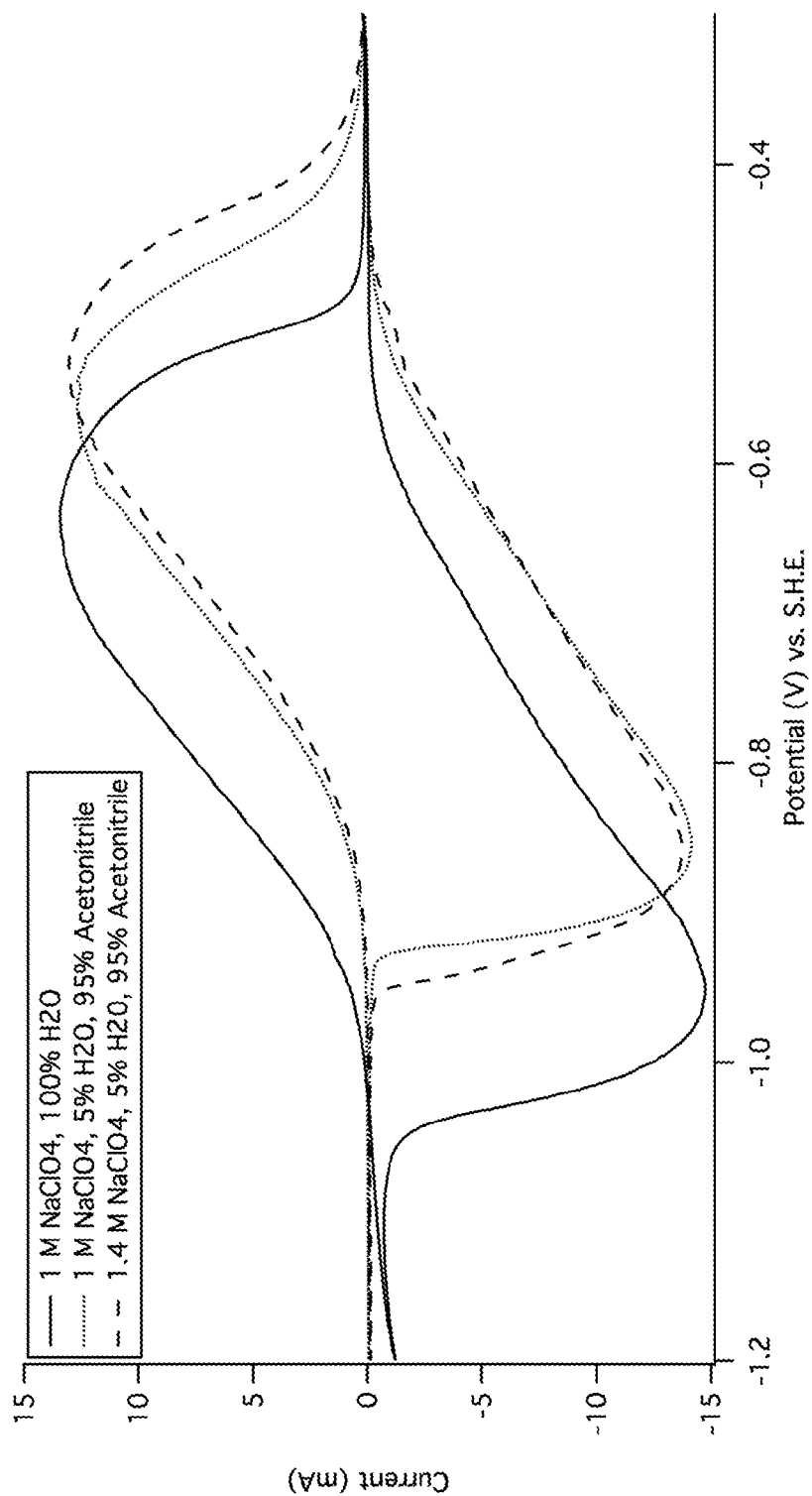
FIG. 4 illustrates a cyclic voltammogram of MnHCMn in cosolvents.

FIG. 4 illustrates a cyclic voltammogram of MnHCMn in cosolvents. Cyclic voltammetry of the lower operational potential of manganese hexacyanomanganate(II/I) is shown in aqueous 1 M $NaClO_4$ and 1 M $NaClO_4$ containing 95% solvent volume acetonitrile and 5% solvent volume water. Reversible cycling is achieved even with only 5% water present. The background current at −0.9 V is 1 mA in purely aqueous electrolyte, but only 0.1 mA in the primarily organic cosolvent electrolytes, demonstrating improved coulombic efficiency with an organic primary cosolvent.

Figure 5:
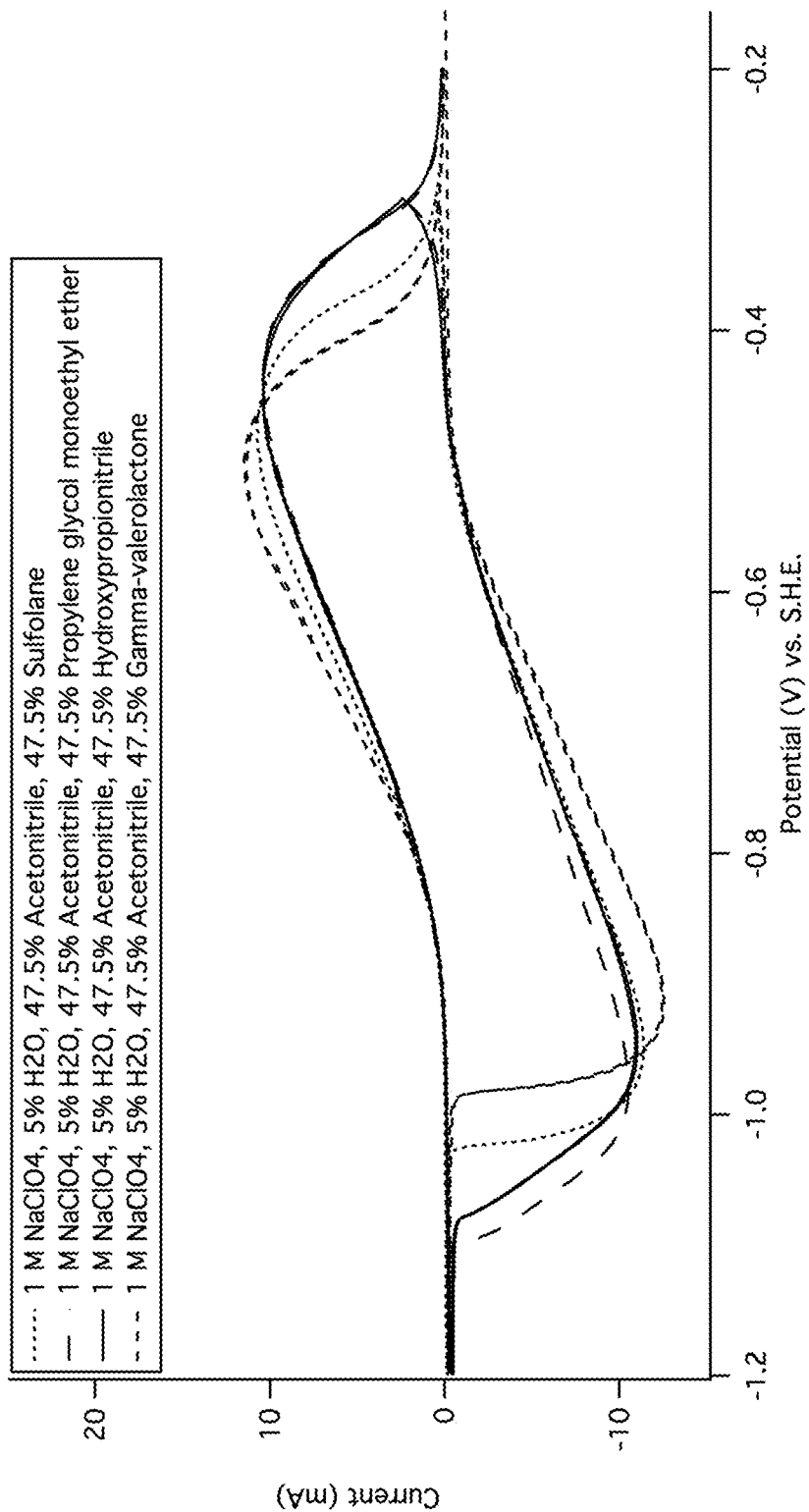
FIG. 5 illustrates a cyclic voltammogram of MnHCMn in cosolvents.

FIG. 5 illustrates a cyclic voltammogram of MnHCMn in cosolvents. Cyclic voltammetry of the lower operational potential of manganese hexacyanomanganate(II/I) is shown 1 M $NaClO_4$ containing 5% solvent volume water, 47.5% solvent volume acetonitrile, and 47.5% solvent volume of one of sulfolane, propylene glycol monoethyl ether, hydroxypropionitrile, or gamma-valerolactone. In all cases, cycling of MnHCMn is shown to be reversible.

Figure 6:
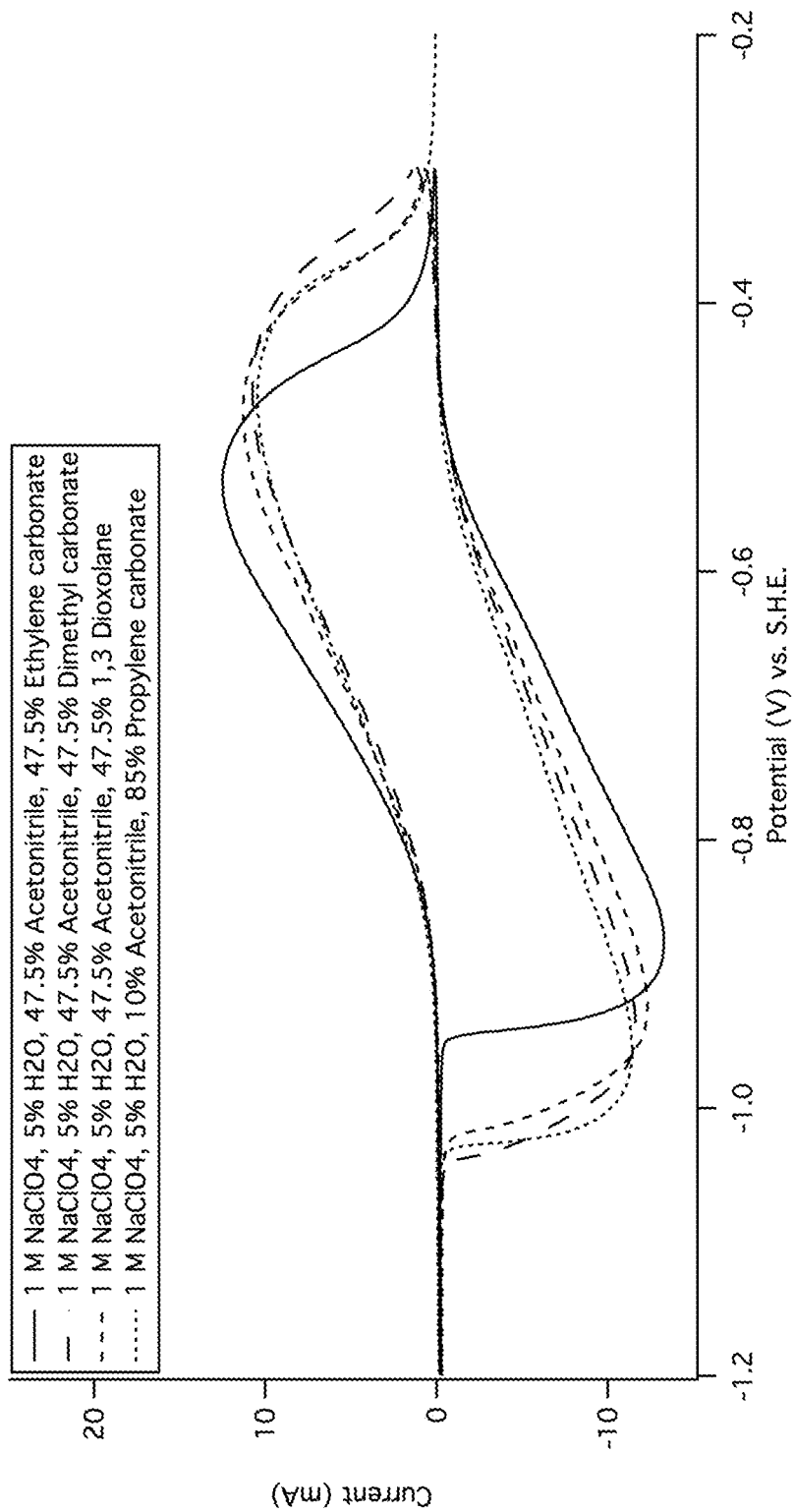
FIG. 6 illustrates a cyclic voltammogram of MnHCMn in cosolvents.

FIG. 6 illustrates a cyclic voltammogram of MnHCMn in cosolvents. Cyclic voltammetry of the lower operational potential of manganese hexacyanomanganate(II/I) is shown 1 M $NaClO_4$ containing 5% solvent volume water, 47.5% solvent volume acetonitrile, and 47.5% solvent volume of one of ethylene carbonate, dimethyl carbonate, or 1,3-dioxolane, or containing 5% solvent volume water, 10% solvent volume acetonitrile, and 85% solvent volume propylene carbonate. In all cases, cycling of MnHCMn is shown to be reversible.

Figure 7:
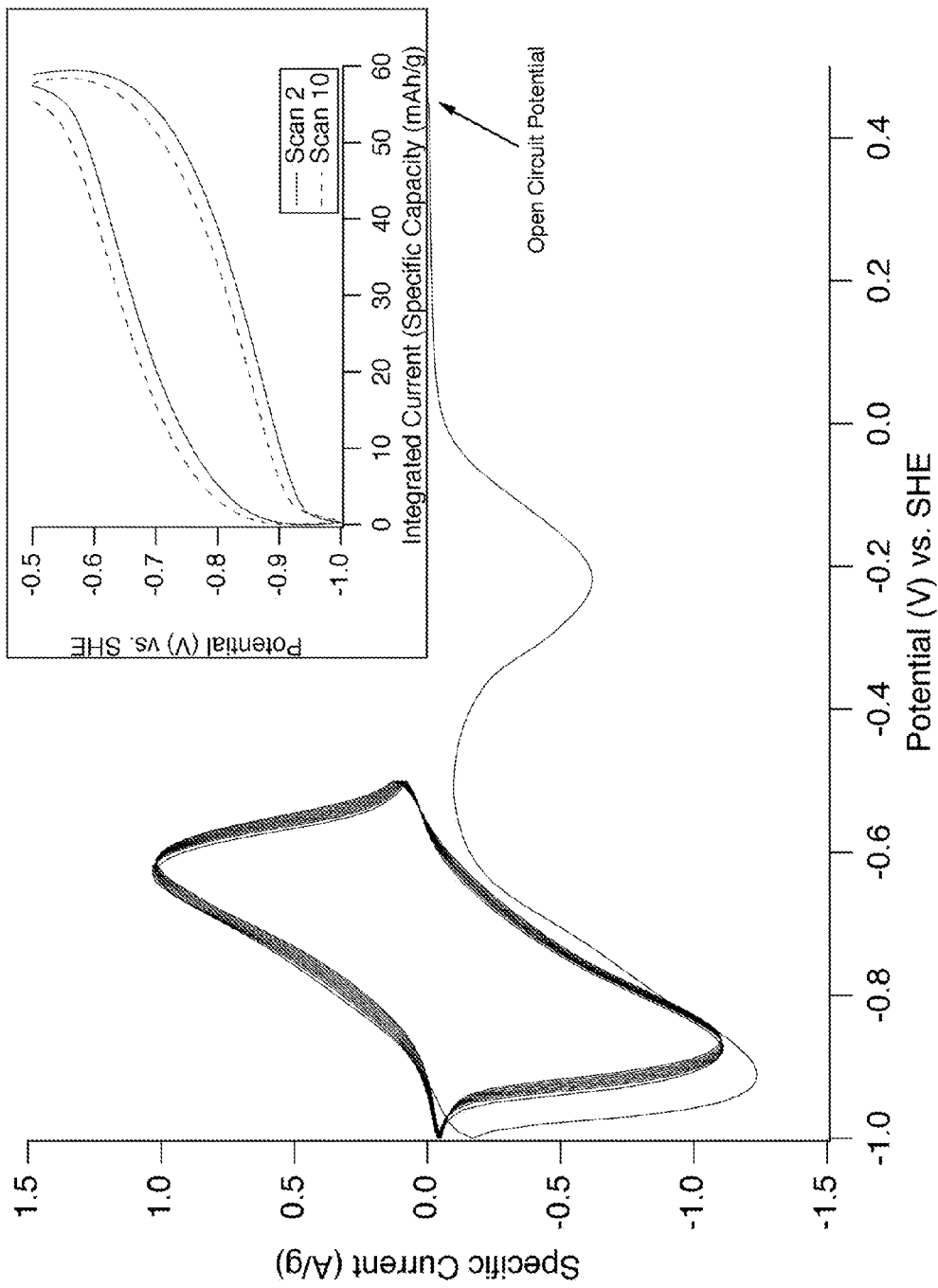
FIG. 7 illustrates a cyclic voltammogram and integrated current of MnHCMn in 90% MeCN.

FIG. 7 illustrates a cyclic voltammogram and integrated current of MnHCMn in 1 M $NaClO_4$ in 90% solvent volume acetonitrile and 10% solvent volume water. Main Figure: cyclic voltammetry of MnHCMn(II/I) in 1 M $NaClO_4$, 90%/10% $MeCN/H_2O$ shows an extremely reversible reaction centered at −0.75 V vs. SHE. The open circuit potential of the material is above the upper reaction [MnHCMN(III/II)] so during the first reductive sweep two reactions are observed. The peak current of ±1.2 A/g is the equivalent of a 20 C galvanostatic cycling rate, indicating extremely fast kinetics. Inset Figure: integration of the current during each scan gives the specific charge and discharge capacity of the electrode. About 57 mAh/g is observed, in close agreement with the approximate theoretical specific capacity of 60 mAh/g. A coulombic efficiency of well over 95% is achieved. There is little capacity fading, in agreement with GCPL measurements of MnHCMn(II/I) in the same electrolyte.

Figure 8:
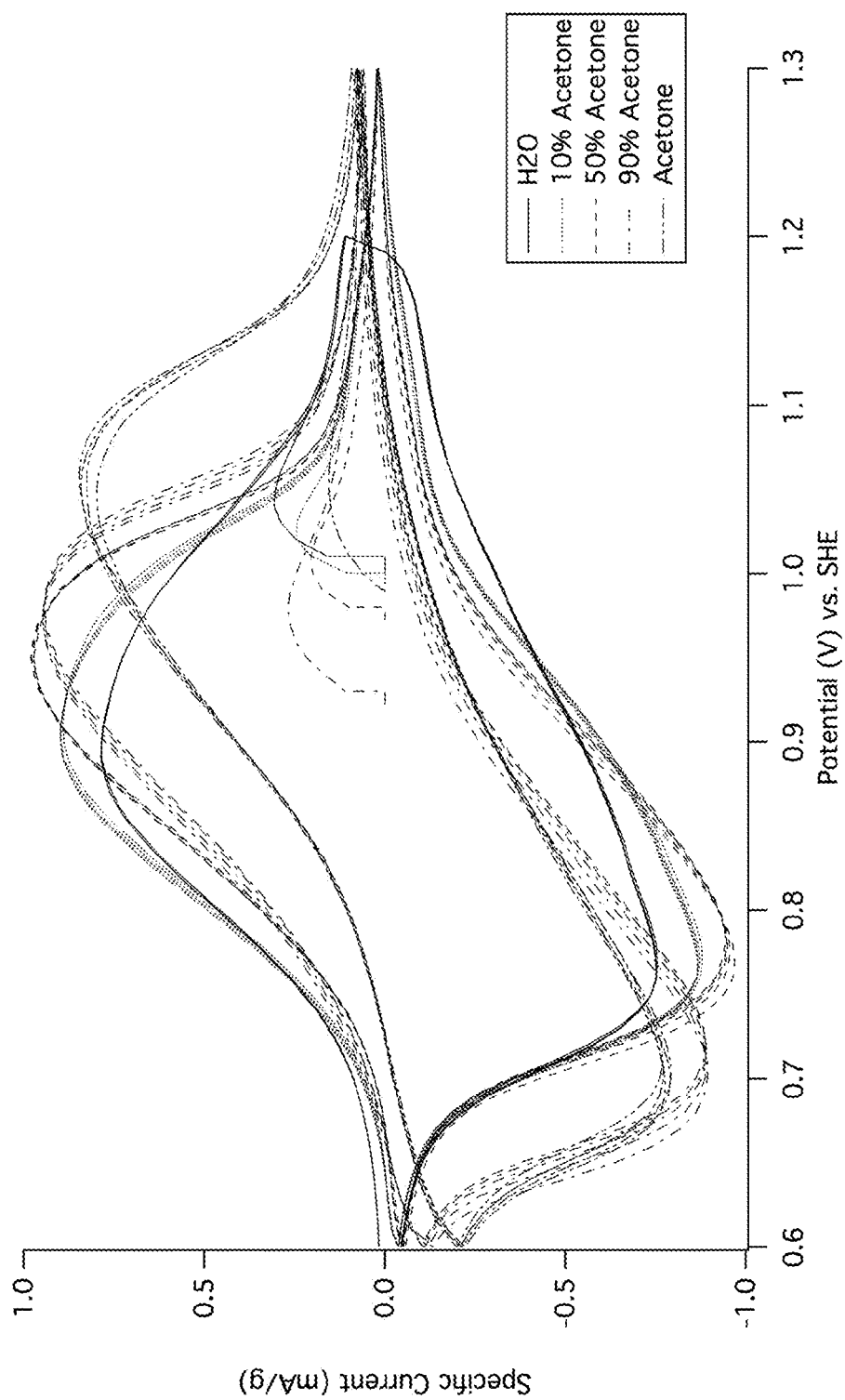
FIG. 8 illustrates a cyclic voltammogram of CuHCF in cosolvents.

FIG. 8 illustrates a cyclic voltammogram of CuHCF in cosolvents containing varying amounts of acetone. Cyclic voltammetry is shown of the copper hexacyanoferrate cathode in aqueous 1 M $NaClO_4$ and in 1 M $NaClO_4$ containing up to 90% solvent volume acetone and as little as 10% solvent volume water. There is little change in the potential of the reaction with increasing amounts of the cosolvent. No clear trend is observed in the small effects of the cosolvent on the reaction potential and kinetics of the charge and discharge of the electrode.

Figure 9:
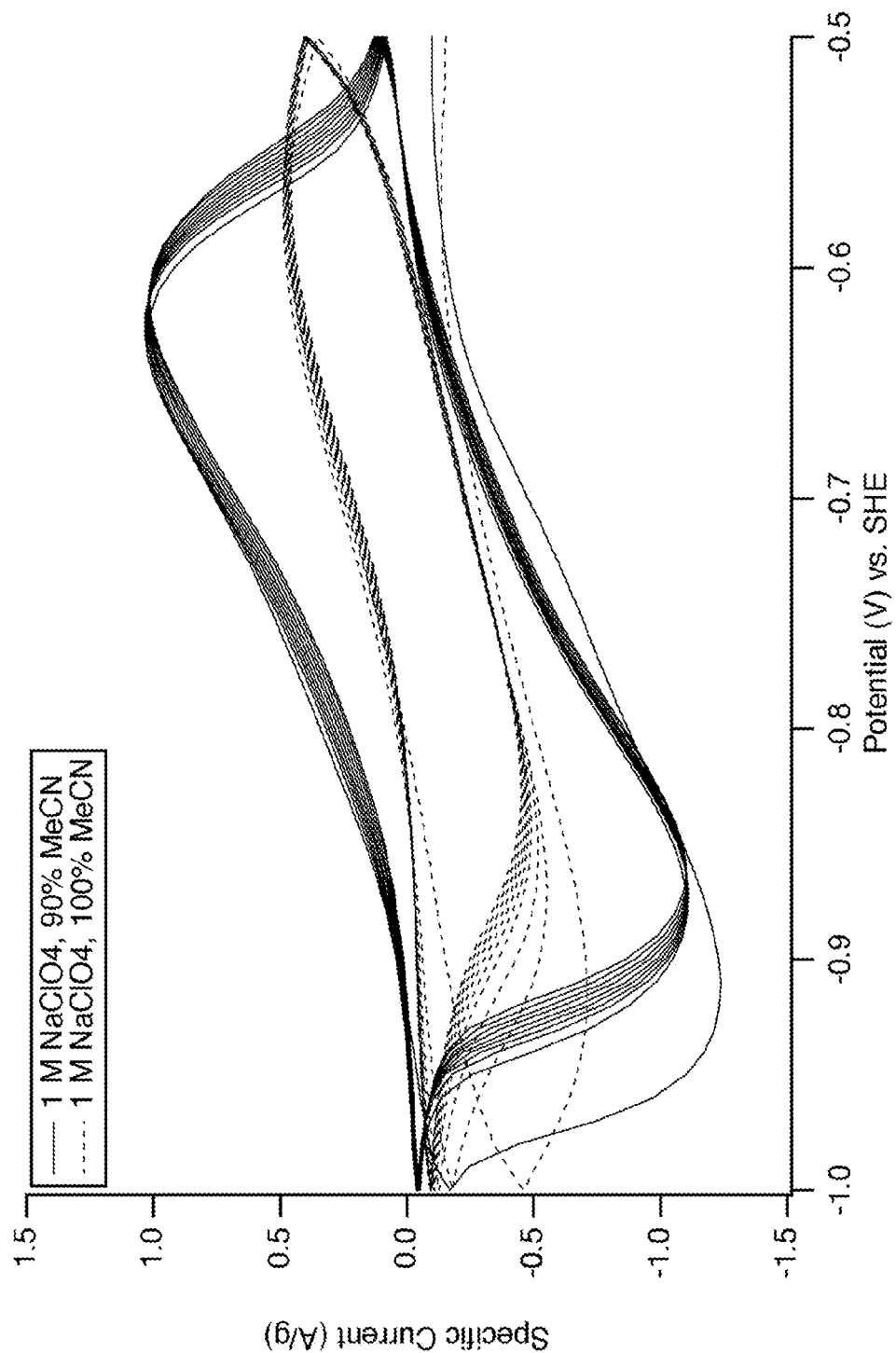
FIG. 9 illustrates a cyclic voltammogram of MnHCMn in 90% or 100% MeCN.

FIG. 9 illustrates a cyclic voltammogram of MnHCMn in 90% or 100% MeCN. Cyclic voltammetry is shown of the lower reaction manganese hexacyanomanganate(II/I) in 1 M NaClO$_4$ containing either 100% solvent volume acetonitrile or 90% solvent volume acetonitrile and 90% solvent volume water. The electrode has very poor kinetics and a poor current response in the 100% solvent volume acetonitrile electrolyte. In contrast, the addition of 10% water to the acetonitrile results in a reaction with faster kinetics and a higher peak current.

Figure 10:
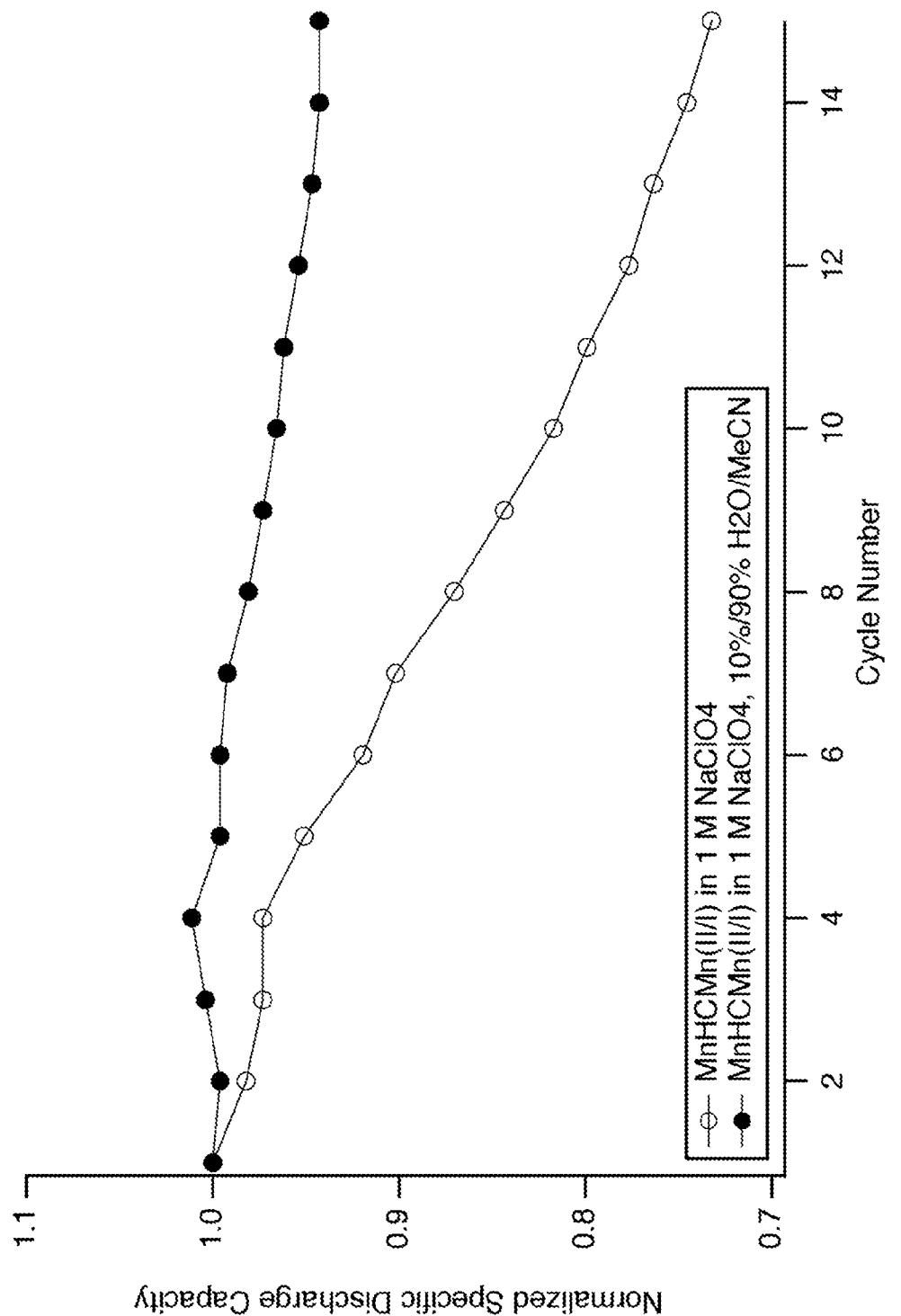
FIG. 10 illustrates a cycle life of MnHCMn in half cells.

FIG. 10 illustrates a cycle life of MnHCMn in half cells. During cycling in 1 M NaClO$_4$ containing 90% solvent volume acetonitrile and 10% solvent volume water, MnHCMn(II/I) shows good cycle life, losing only 5% of its initial discharge capacity after 15 cycles. In contrast, in aqueous 1 M NaClO$_4$ with no acetonitrile present, 25% of the initial discharge capacity is lost after 15 cycles.

Figure 11:
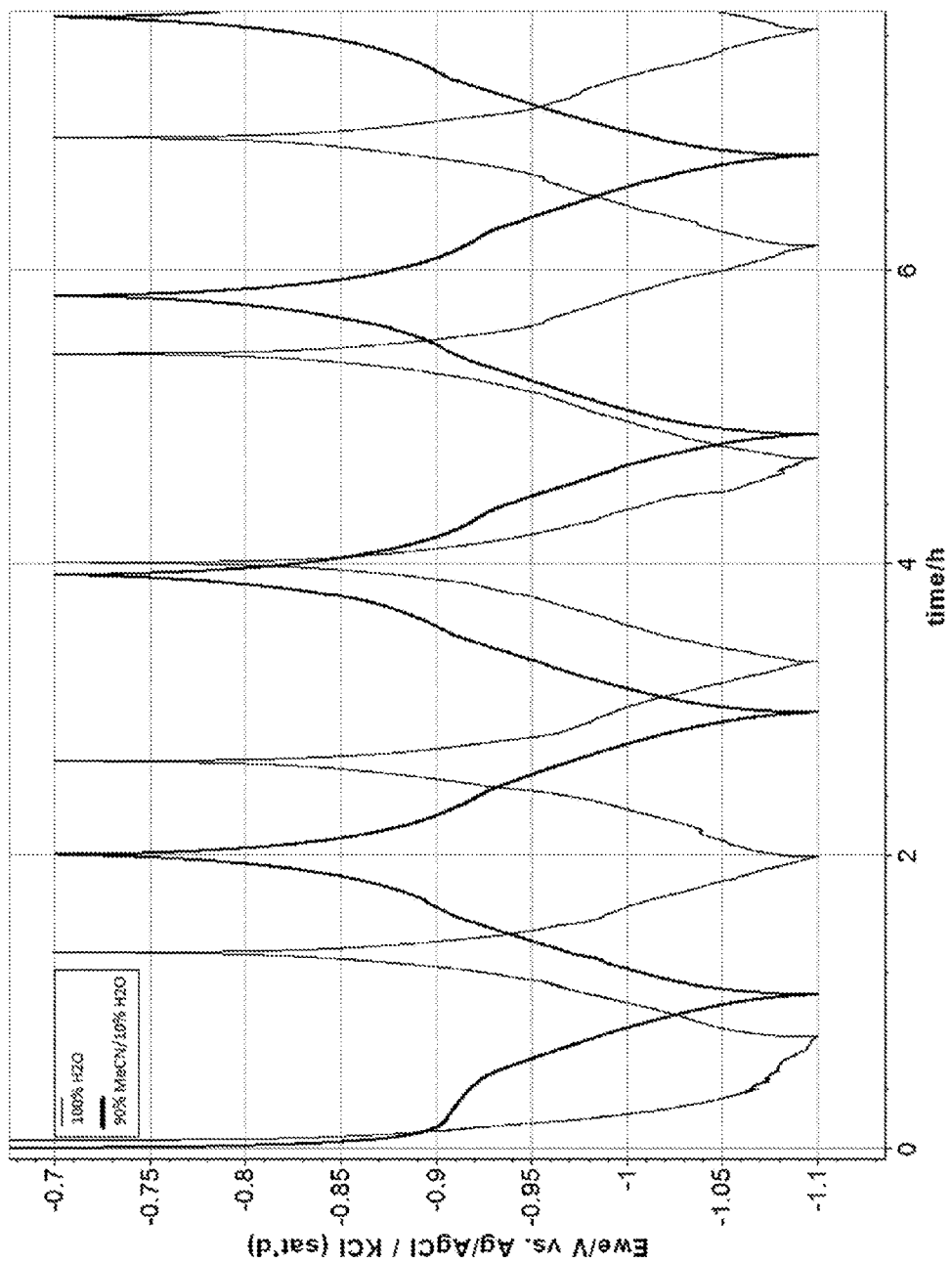
FIG. 11 illustrates a set of potential profiles of MnHCMn in half cells.

FIG. 11 illustrates a set of potential profiles of MnHCMn in half cells. The potential profiles of MnHCMn(II/I) are shown during cycling in two different electrolytes: aqueous 1 M NaClO$_4$ containing no organic cosolvent, and 1 M NaClO$_4$ containing 90% solvent volume acetonitrile and 10% solvent volume water. In both electrolytes, the MnHCMn reaction is centered at −0.95 V vs. Ag/AgCl, or equivalently, −0.75 V vs. SHE. Though both samples were cycled at the same 1 C rate, the sample operated in the purely aqueous electrolyte shows a much lower capacity of 40 mAh/g as rapid hydrolysis upon its insertion into the cell consumed one third of its capacity. In contrast, the MnHCMn electrode operated in the electrolyte containing the organic primary cosolvent had a specific discharge capacity of over 55 mAh/g, much closer to the maximum theoretical value (see FIG. 10).

Figure 12:
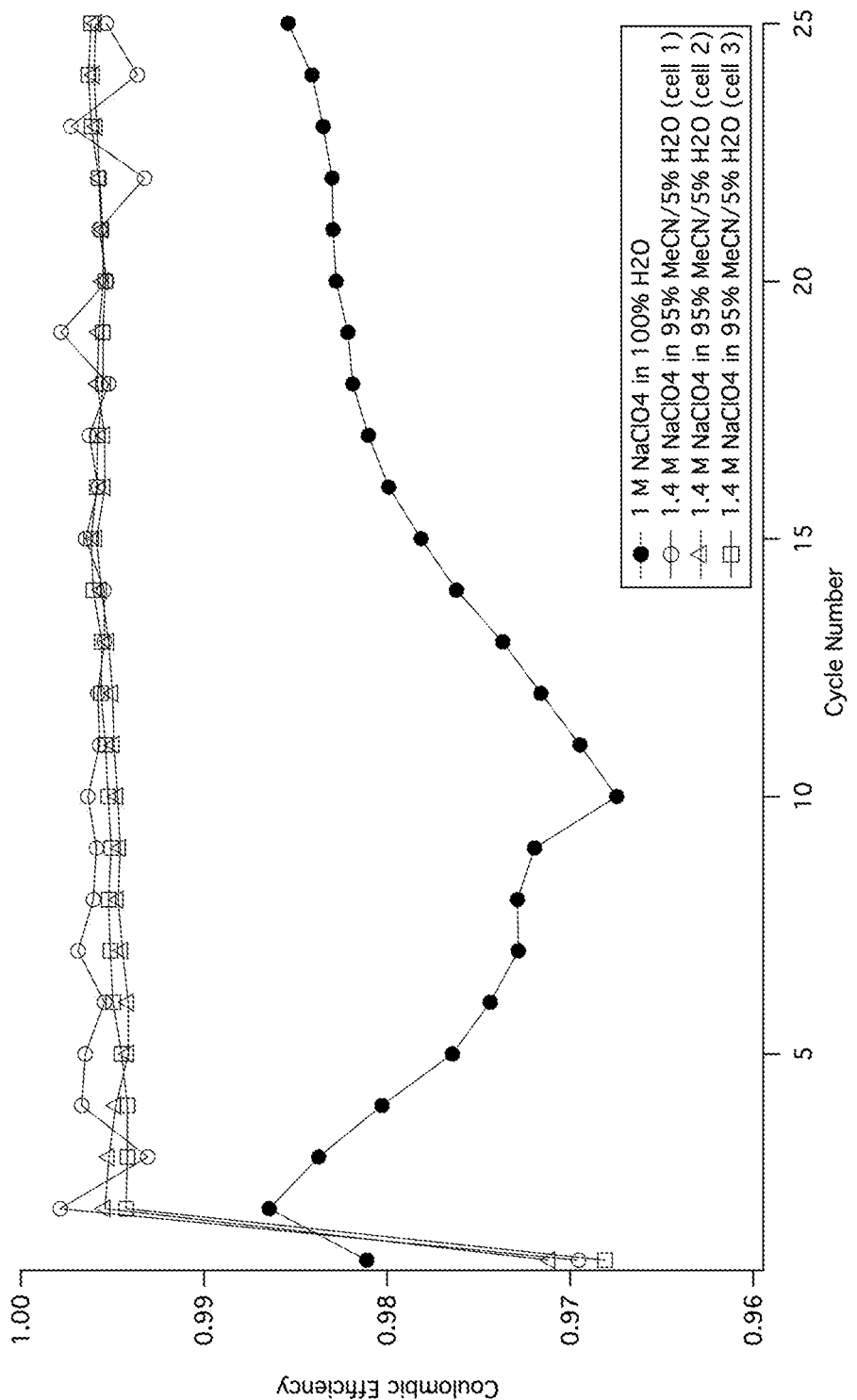
FIG. 12 illustrates a cycle life of CuHCF in half cells.

FIG. 12 illustrates a set of coulombic efficiencies of MnHCMn in half cells operated by galvanostatic cycling between −0.95 V and −0.5 V vs. SHE. The coulombic efficiency is defined as the ratio for each cycle of the discharge capacity divided by the charge capacity. In the cell containing an electrolyte of 1 M NaClO$_4$ and 100% solvent volume water, a coulombic efficiency of less than 99% is observed. In three identical cells each containing an electrolyte of 1.4 M NaClO$_4$, 95% solvent volume acetonitrile, and 5% solvent volume water, a coulombic efficiency of over 99.5% is observed.

Figure 13:
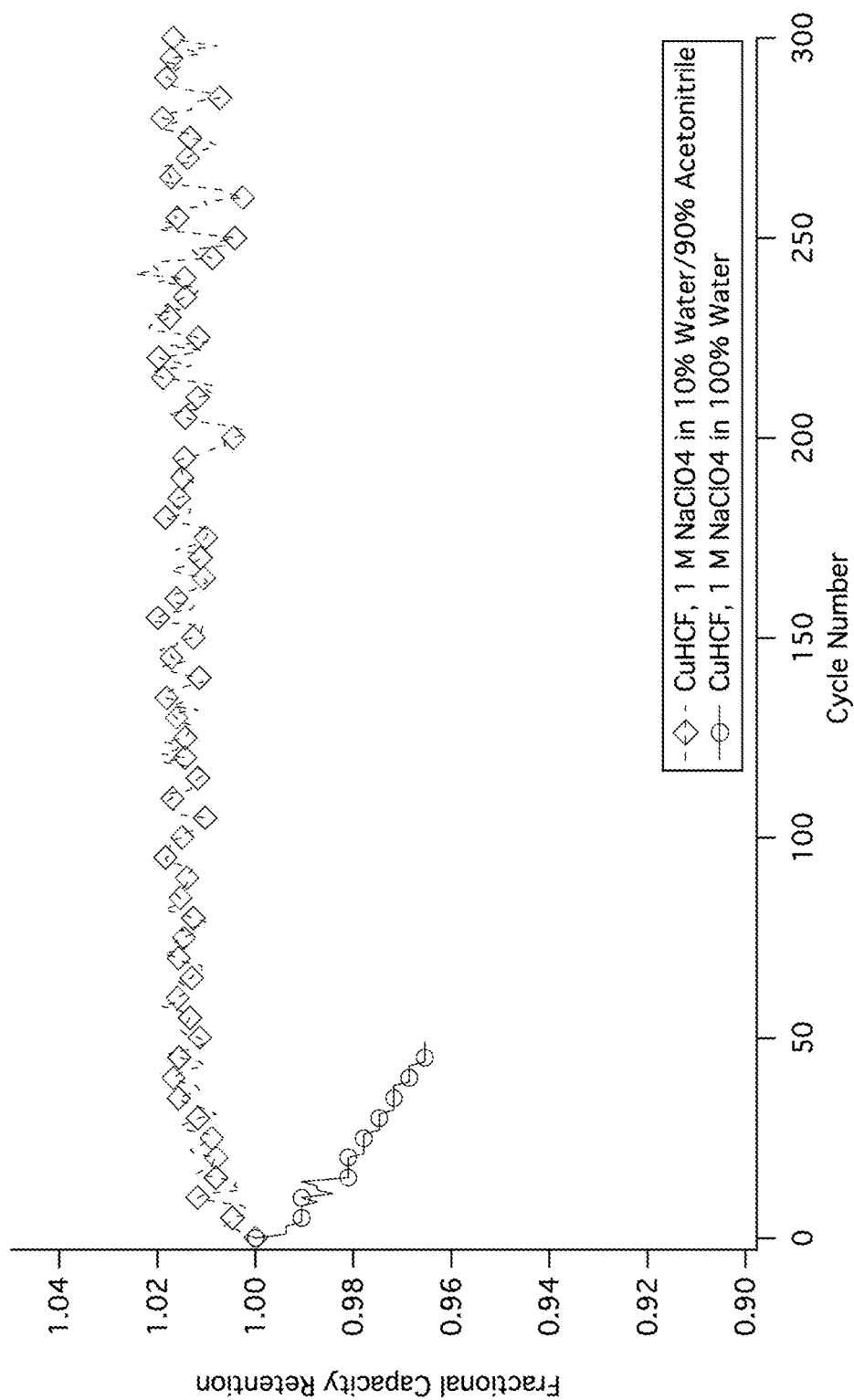
FIG. 13 illustrates a set of GCPL vs. time profiles of MnHCMn vs. CuHCF in the full cell.

FIG. 13 illustrates a cycle life of CuHCF in half cells. During cycling of CuHCF at a 1 C rate in aqueous 1 M NaClO$_4$ containing no organic cosolvents, 4% of the initial discharge capacity is lost after 50 cycles. In contrast, during cycling of CuHCF at a 1 C rate in 1 M NaClO$_4$ containing 90% solvent volume acetonitrile and 10% solvent volume water, zero capacity loss is observed after 300 cycles.

Figure 14:
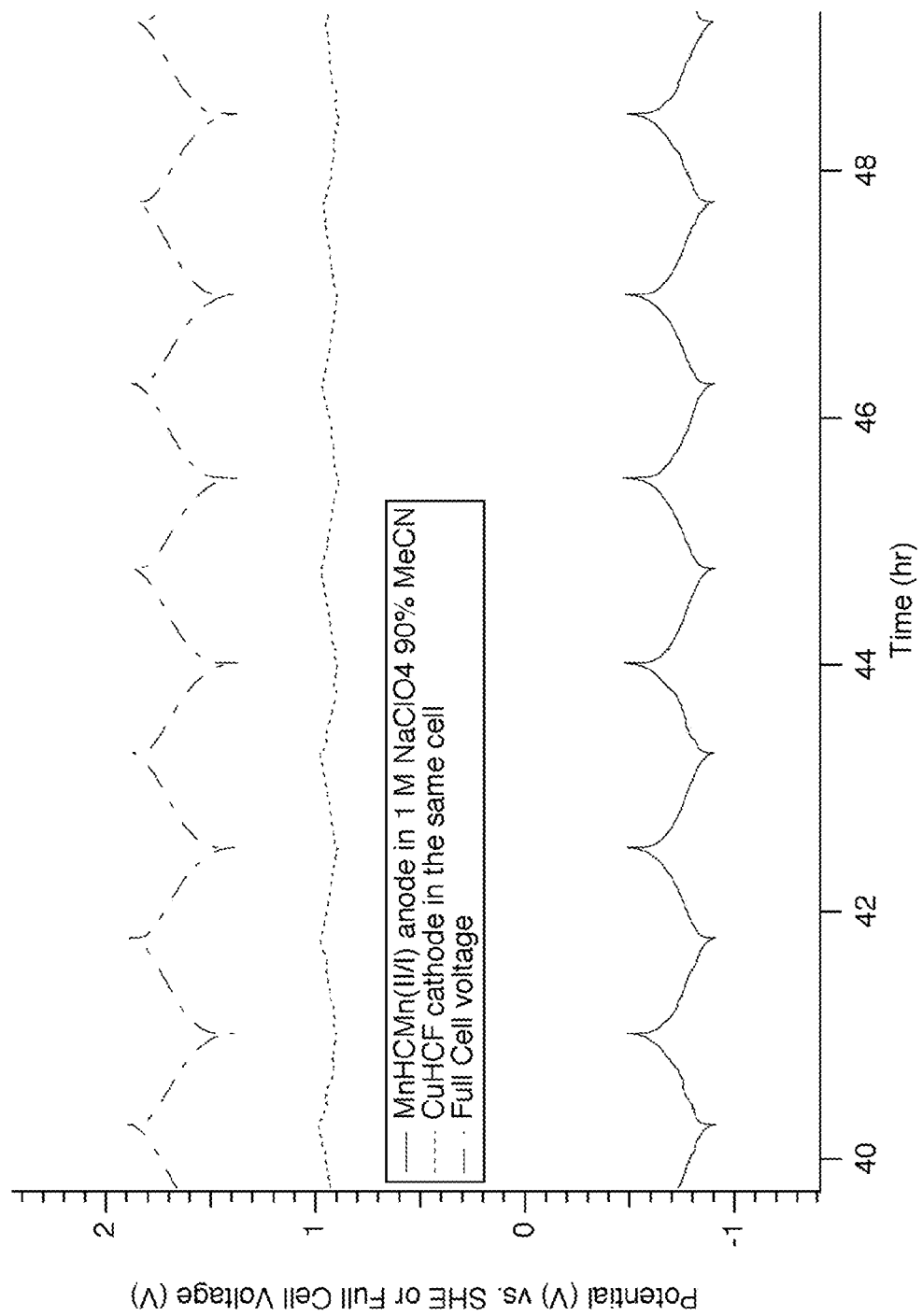
FIG. 14 illustrates a full cell voltage profile.

FIG. 14 illustrates a set of GCPL vs. time profiles of MnHCMn vs. CuHCF in the full cell. The potential profiles of the CuHCF cathode and MnHCMn(II/I) anode in a full cell, and the full cell voltage profile are shown. The electrolyte was 1 M NaClO$_4$, 10% solvent volume H$_2$O, 90% solvent volume MeCN, and cycling was performed at a 1 C rate with the anode operated as the working electrode. An excess of CuHCF was used in this case to avoid any oxygen generation at high potentials, so the potential profile of the cathode is flatter than that of the anode.

Figure 15:
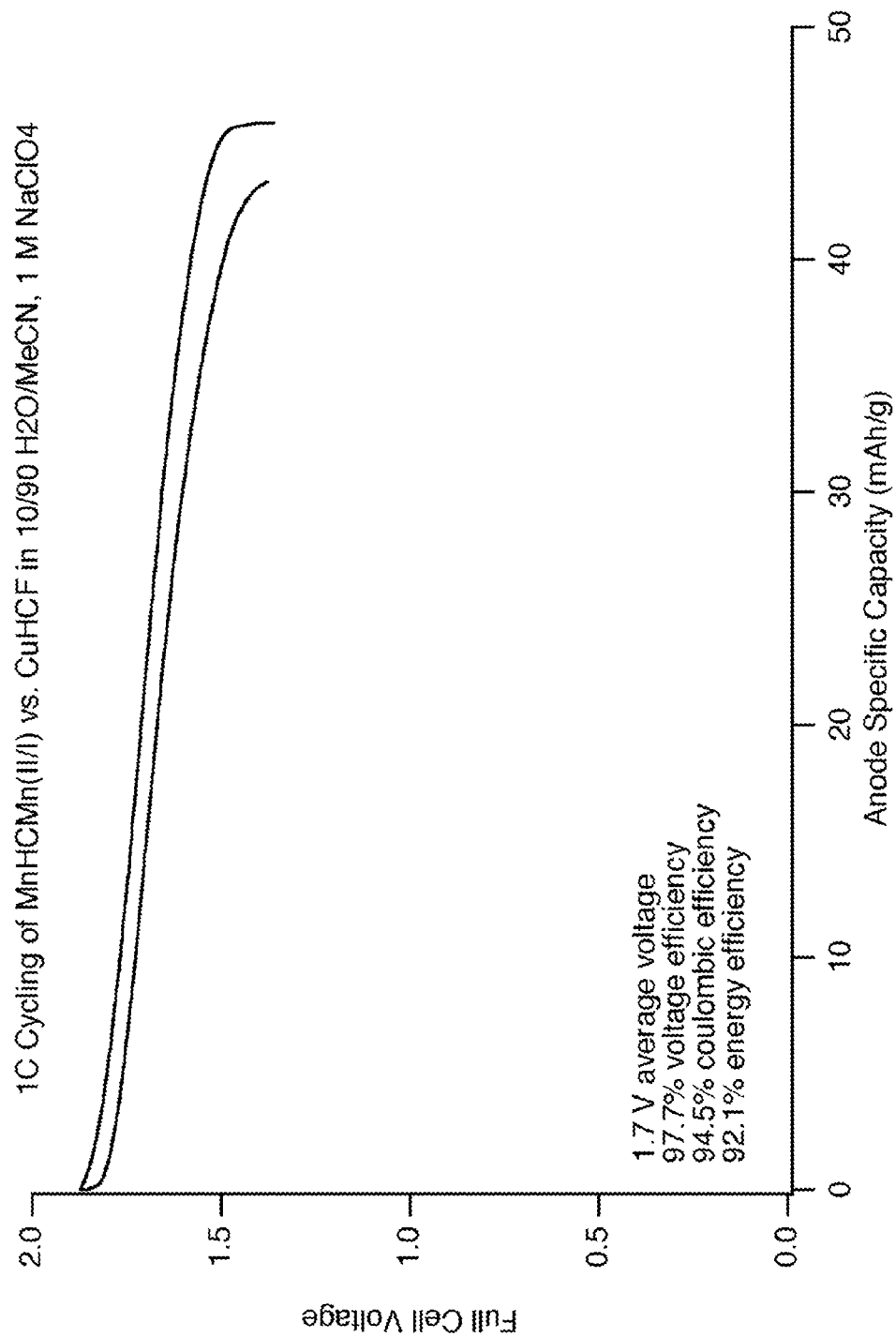
FIG. 15 illustrates a full cell voltage profile of the cell illustrated in FIG. 13.

FIG. 15 illustrates a full cell voltage profile. The full cell voltage profile is of the cell shown in FIG. 13. The average voltage of the cell is 1.7 V, nearly double the voltage achievable if the MnHCMn(III/II) reaction is used. The result is a cell with significantly higher energy and power.

Figure 16:
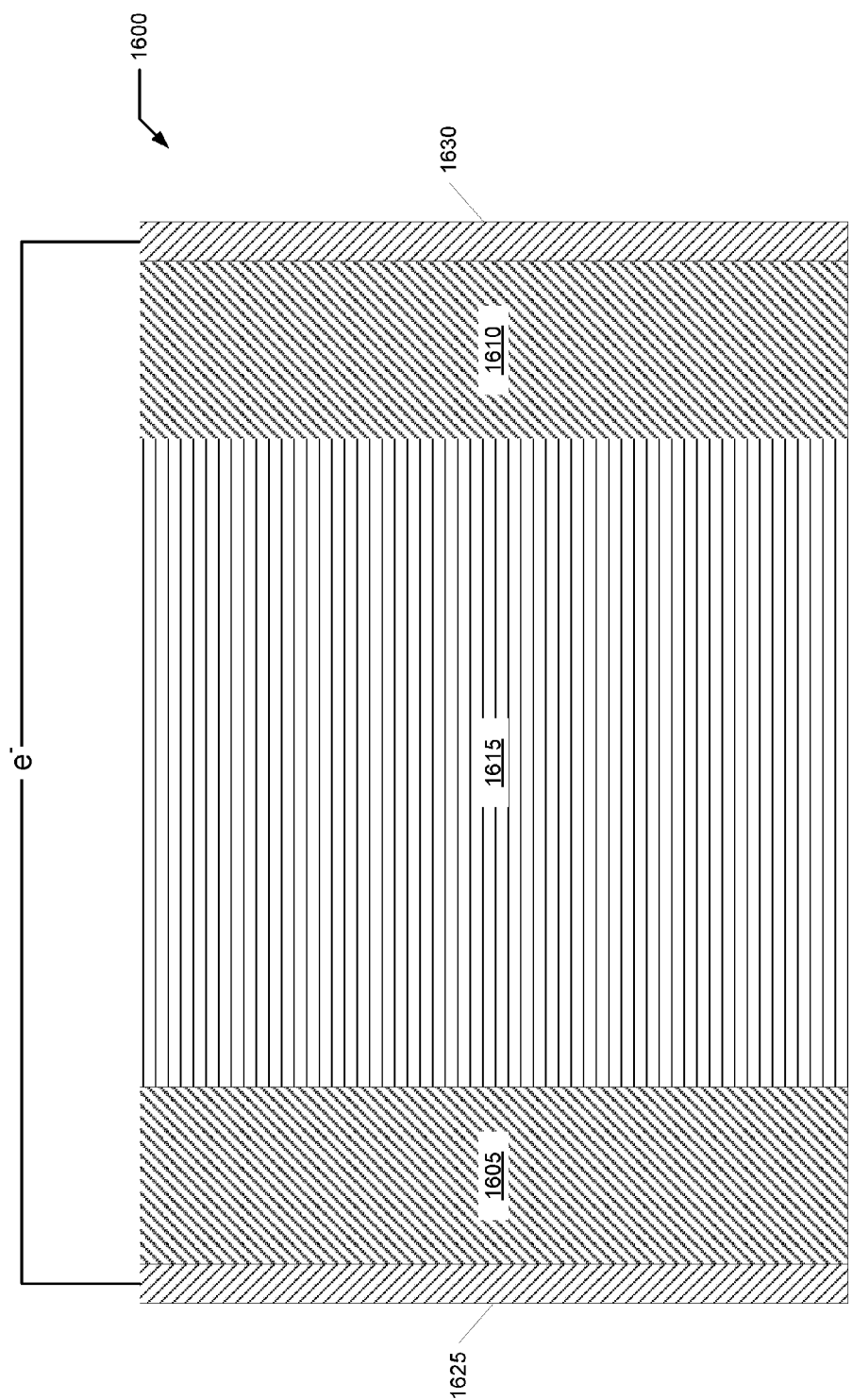
FIG. 16 illustrates a representative secondary electrochemical cell schematic having one or more TMCCC electrodes disposed in contact with a cosolvent electrolyte as described herein

FIG. 16 illustrates a representative secondary electrochemical cell 1600 schematic having one or more TMCCC electrodes disposed in contact with a cosolvent electrolyte as described herein. Cell 1600 includes a negative electrode 1605, a positive electrode 1610 and an electrolyte 1615 electrically communicated to the electrodes.

Overview

A battery (or cell) comprises an anode, a cathode, and an electrolyte that is in contact with both the anode and the cathode. Both the cathode and the anode contain an electrochemically active material that may undergo a change in valence state, accompanied by the acceptance or release of cations and electrons. For example, during discharge of a battery, electrons are extracted from the anode to an external circuit, while cations are removed from the anode into the electrolyte. Simultaneously, electrons from the external circuit enter the cathode, as do cations from the electrolyte. The difference in the electrochemical potentials of the cathode and anode results in a full cell voltage. This voltage difference allows energy to be extracted from the battery during discharge, or stored in the battery during charge.

The electrolyte in a battery allows ions to flow from one electrode to the other, but that insulates the two electrodes from one another electronically. Typically battery electrolytes include aqueous acids and salts in lead acid and bases nickel/metal hydride batteries, and organic liquids containing lithium salts in lithium-ion batteries. The electrolyte may also contain additives that stabilize the electrodes, prevent side chemical reactions, or otherwise enhance battery performance and durability. The electrolyte may also contain multiple liquid components, in which case they are known as cosolvents. The liquid component making up the majority of the electrolyte is typically known as the primary solvent, while those making up the minority are known as minority solvents.

Organic cosolvents have been used in battery electrolytes in some types of batteries. For example, commercial lithium-ion battery electrolytes contain a variety of organic cosolvents, including ethylene carbonate, diethyl carbonate, propylene carbonate, and others. Those battery electrodes never include water as a minority solvent. Other aqueous electrolyte batteries such as lead acid, nickel/metal hydride, and flow batteries typically do not use cosolvent electrolytes. There is no precedent among previously documented battery systems for cosolvent electrolytes containing water as a minority component.

An electrolyte containing organic cosolvents in combination with water as a minority cosolvent offers several advantages in comparison to electrolytes that are either primarily aqueous or that contain solely organic cosolvents. First, when water is present as only a minority cosolvent, its decomposition into hydrogen and oxygen is suppressed, and a larger practical electrochemical stability window is achieved (FIGS. 1, 4). Second, electrode materials and other battery materials that are water-sensitive and may decompose by a hydrolysis mechanism are more stable when water is only a minority component of the system. Third, water has higher ionic conductivity than the organic solvents typically used in battery electrodes, so its presence as a minority cosolvent increases the electrolyte conductivity.

Cosolvent electrolytes are of interest for the stabilization of TMCCC electrodes that have inherent solubility in aqueous battery electrolytes. Copper hexacyanoferrate (CuHCF) is a TMCCC recently demonstrated to be a high performance battery electrode. (See Reference Number 2.) In the open framework structure of CuHCF, iron is six-fold, octahedrally coordinated to the carbon ends of the cyanide branching ligands, while copper is octahedrally nitrogen-coordinated (FIG. 3). Depending on the method of synthesis, the A sites in CuHCF may contain potassium or another alkali cation such as sodium or lithium, or another type of cation such as ammonium. More generally, for a TMCCC of the general chemical formula $A_xP_y[R(CN)_6]_z \cdot nH_2O$, alkali cations $A^+$ and water occupy the interstitial A Sites, transition metal P cations are six-fold nitrogen coordinated, and transition metal R cations are six-fold carbon coordinated.

In the work described here, the electrochemical cells contained a TMCCC working electrode, a counter electrode, an electrolyte in contact with both the anode and cathode, and a Ag/AgCl reference electrode used to independently measure the potentials of the anode and cathode during charge and discharge of the cell. When the electrode of interest was a cathode material, then the working electrode was the cathode, and the counter electrode was the anode. When the electrode of interest was an anode material, then the working electrode was the anode, and the counter electrode was the cathode. In the case that the cell did not contain both a TMCCC cathode and a TMCCC anode, a capacitive activated charcoal counter electrode was used to complete the circuit while allowing the study of a single TMCCC electrode.

Electrochemical characterization of electrodes was performed using cyclic voltammetry (CV) and galvanostatic cycling with potential limitation (GCPL). During the CV technique, the potential of the working electrode is swept at a constant rate between high and low cutoff potentials, and the resulting current into or out of the electrode is measured. During the GCPL technique a constant current is applied to the cell until the working electrode reaches a maximum or minimum potential; upon reaching this potential extreme, the sign of the current is reversed.

Researchers have used TMCCCs as battery electrodes in cells containing aqueous and organic electrolytes (See Reference Numbers 12-24). For example, the reversible reduction of Prussian Blue to Everitt's Salt has allowed its use as an anode in aqueous cells. (See Reference Numbers 14-17 and 19-20.) However, the electrochemical potential of Prussian Blue is relatively high, so using it as an anode with a TMCCC cathode results in a low full cell voltage of 0.5-0.7 V vs. SHE. Such low voltages make these cells impractical, as many cells in series would be required to achieve the high voltages needed for many applications.

Chromium hexacyanochromate (CrHCCr) has also been used as an anode in full cells that also contained Prussian Blue cathodes, and an aqueous/Nafion electrolyte. (See Reference Number 22.) The performance of these cells was limited by the low potential and poor coulombic efficiency of CrHCCr in aqueous electrolytes and the use of acidic electrolytes in which CrHCCr hydrolyzes.

TMCCC anodes containing electrochemically active hexacyanomanganate groups have also been recently demonstrated. Examples include manganese hexacyanomanganate (MnHCMn), and zinc hexacyanomanganate (ZnHCMn). In hexacyanomanganate-based TMCCC anodes, the hexacyanomanganate groups undergo two electrochemical reactions. First, $Mn^{III}(CN)_6$ can be reversibly reduced to $Mn^{II}(CN)_6$ at potentials near or above 0 V vs. SHE. Second, $Mn^{II}(CN)_6$ can be reduced to $Mn^{I}(CN)_6$ at lower potentials, typically below −0.4 V vs. SHE. In general, the lower reaction cannot be efficiently used in aqueous electrolytes due to the simultaneous generation of hydrogen gas at such low potentials. One exception is chromium hexacyanomanganate (CrHCMn), which has a lower reaction potential of about −0.35 V, but high-purity CrHCMn is extraordinarily difficult to synthesize due to its affinity to form other phases such as mixed cyanides and oxides of chromium. In no prior art has the lower reaction of any hexacyanomanganate-based TMCCC been used with high coulombic efficiency in aqueous electrolytes.

Though the use of a basic electrolyte would result in a lower potential for the onset of $H_2$ generation, TMCCCs rapidly decompose at high pH except in the presence of an excess of free cyanide anions, which are a severe safety hazard. Mildly acidic or neutral electrolytes are needed for them to be stable. Thus, only the upper reaction of MnHCMn can be used without deleterious $H_2$ production. As the upper stability limit of these aqueous electrolytes is near 1 V, MnHCMn can be paired with a cathode such as CuHCF to produce a battery with an average full cell voltage of about 0.9-1 V.

TMCCCs have also been used as cathodes, but not as anodes, in organic electrolyte batteries. (See Reference Numbers 12-13, 21, 23-24.) Most commonly, they have been used as cathodes in place of the standard $LiCoO_2$ cathode found in high-voltage organic electrolyte Li-ion cells. A number of studies have demonstrated TMCCCs containing electrochemically active iron and/or manganese as cathodes in these high voltage cells.

TMCCCs have not been previously used as battery electrodes in cosolvent electrolytes in which water is a minority cosolvent. In recently published patent application, we described the opportunity to do so for the specialized case of water acting as the primary cosolvent. (See Reference Number 7.) However, a practical cosolvent had not yet been identified, and the cosolvent electrolytes described in that document decompose into multiple phases under some circumstances, making them impractical for use in an actual battery. In addition, in that previous work, the idea of a cosolvent was described and claimed in the context of an organic liquid additive to a water, with water as the primary solvent of the electrolyte. Herein we describe for the first time the principles for selecting cosolvents and electrolyte salts to combine with water to produce stable, single phase aqueous cosolvent electrolytes in which TMCCC electrodes operate with high efficiency, fast kinetics, and long lifetime. In addition, we demonstrate for the first time the operation of TMCCC electrodes in aqueous cosolvent electrolytes in which water is a minority solvent of the electrolyte, and an organic solvent is the primary solvent.

U.S. Patent Application No. 61/722,049 filed 2 Nov. 2012 includes a discussion of various electrolyte additives to aqueous electrolytes, as well as coatings on the electrodes of electrochemical cells, that can improve a rate of capacity loss. U.S. Patent Application No. 61/760,402 filed 4 Feb. 2013 includes a discussion of a practical TMCCC anode. Both of these patent applications are hereby expressly incorporated in their entireties by reference thereto for all purposes.

Herein we discuss and demonstrate for the first time the use of a practical aqueous cosolvent electrolyte for batteries containing a TMCCC anode and a TMCCC cathode. The use of an organic liquid as the primary solvent, with water as a minority solvent has no significant effects on the kinetics or reaction potentials of either TMCCC anodes or TMCCC cathodes as compared to the performance of those electrolytes in aqueous electrolytes containing no organic solvents. In addition, the cosolvent stabilizes TMCCCs against dissolution and hydrolysis, resulting in greater electrode stability and longer cycle and calendar life.

Our previous demonstration of the operation of TMCCC cathodes in cosolvent electrolytes did not demonstrate the use of an organic solvent as the majority electrolyte, and it considered only the effect of an organic minority cosolvent on the performance of TMCCC cathodes without showing the reduction to practice of a full cell containing a cosolvent electrolyte. Furthermore, it did not address the extreme sensitivity of hexacyanomanganate-based TMCCC anodes to electrolyte composition. For these reasons, among others, the work described here is novel and independent.

The addition of an organic cosolvent as the majority component to the battery electrolyte is especially important for the performance and lifetime of TMCCC anodes. Whereas without any cosolvents, the upper reaction of the MnHCMn anode must be used in aqueous electrolytes, here we show that the addition of a cosolvent to the electrolyte suppresses electrolysis of water to hydrogen gas. In a full cell also containing a CuHCF cathode, the result in an increase in average discharge voltage from about 0.9 V to about 1.7 V (FIG. 1). Nearly doubling the cell voltage has extraordinary ramifications for the performance and cost of the battery. Energy scales proportionally with voltage, while power scales with the square of the voltage. Thus, nearly doubling the voltage while using the same electrode materials results in about twice the energy and nearly four times the power, at about the same materials cost. Without the presence of a cosolvent that limits the rate of hydrogen production at the anode, cells with a TMCCC anode and cathode cannot achieve high efficiency at voltages above about 1.3 V. Thus, the addition of the cosolvent increases the maximum practical voltage, energy, and power of the cell.

Prior study of Prussian Blue analogues in organic electrolytes did include the use of organic cosolvent electrolytes in some cases. However, in anhydrous conditions, the kinetics of TMCCC electrodes are vastly reduced, making these electrodes impractical for high power applications. In this work, we demonstrate for the first time the use of aqueous cosolvent electrolytes containing non-negligible amounts of water. That water must be present for the TMCCC electrodes to be rapidly charged or discharged.

As a first example, acetonitrile (also known as methyl cyanide, or MeCN) is chosen as a cosolvent to be used in electrolytes for batteries containing TMCCC electrodes. MeCN is fully miscible with water and is electrochemically stable over a much wider potential range than water itself. High purity, anhydrous MeCN is used in commercial ultracapacitors. Here, reagent-grade MeCN was used, as low voltage cells are less sensitive to electrolyte impurities that may result in parasitic side reactions at extreme potentials.

The choice of MeCN provides an additional benefit for the specific case of a battery containing TMCCC electrodes. In a cosolvent electrolyte containing MeCN as the primary solvent, the solvation shells of the TMCCC electrode particles will primarily be cyanide groups in which nitrogen faces the particle. This completes the six-fold nitrogen coordination of P-site cations in the particle at the surface or adjacent to hexacyanometalate vacancies. The result is improved material stability via suppression of dissolution via the formation of a hydration shell.

Other examples of organic solvents include ethylene carbonate, propylene carbonate, and dimethyl carbonate; sulfolane; 1,3 dioxolane; propylene glycol monoethyl ether; hydroxypropionitrile; diethylene glycol; gamma-valerolactone; acetone; ethylene glycol and glycerol. Organic cosolvents must be polar to allow them to form miscible single phase solutions with water and a salt, but they may be either protic or aprotic.

It is desirable when using hexacyanomanganate-based TMCCC anodes to use water as only a minority cosolvent, and organic liquids as the primary cosolvents. The manganese-carbon bond in hexacyanomanganate is labile and cyanide can be replaced by water and/or hydroxide. The choice of a larger, less polar organic species as the primary solvent results in weaker bonding to Mn and steric hindrance, both of which protect the hexacyanomananate group from suffering ligand exchange leading to its decomposition.

Proper selection of the electrolyte cosolvents, salts, and any additional additives will result in a single-phase system in which all of the components are miscible and do not phase segregate. Phase segregation in a battery electrolyte is undesirable because ion transport will occur primarily in the phase containing the higher salt concentration, while the other, less conductive phase or phases will impede the transport of ions. It is not enough to simply choose liquids that are miscible, as the addition of a salt can lead to decomposition of the electrolyte into multiple phases: for example, one that is mostly water, that has a high salt concentration, and that contains a small amount of the organic solvent, and a second phase that is mostly organic solvent, and contains little water or salt leads to poor performance when there is phase segregation, a problem addressed by proper selection of electrolyte cosolvents.

A very limited number of common electrolyte salts that are highly water soluble are also appreciably soluble in organic solvents. This is because most organic solvents have dielectric constants much lower than that of water. In other words, organic solvents are typically not as polar as water, so the formation of a solvation shell during the dissolution of an ionic salt is not energetically favorable. For example, potassium nitrate, which has a saturation of 3.6 M in water at room temperature, is only sparingly soluble in most organic solvents.

Here, to demonstrate the first reduction to practice of the operation of TMCCC electrodes in cosolvent electrolytes containing an organic primary solvent, we use sodium perchlorate hydrate as the electrolyte salt in cosolvent electrolytes of water and MeCN. The choice of $NaClO_4 \cdot H_2O$ is based on its ability to dissolve in high concentrations (greater than 1 M) over the entire range of cosolvent ratios from 100%/0% water/MeCN to 0%/100% water/MeCN without forming biphasic systems.

The ternary phase diagrams describing the solubility of salts such as $NaClO_4$ in cosolvents such as water/MeCN are tabulated. The general need for high salt concentration and a monophasic electrolyte can be used to select other combinations of salts and cosolvents from these data.

Other cosolvents besides acetonitrile that can be used with water in electrolytes for use in batteries containing TMCCC anodes include, but are not limited to, methanol, ethanol, isopropanol, ethylene glycol, propylene glycol, glycerine, tetrahydrofuran, dimethylformamide, and other small, polar linear and cyclic alcohols, polyols, ethers, and amines. However, while many of these solvents are fully miscible with pure water, they are not miscible in the presence of concentrated salt. For example, more than a few percent isopropyl alcohol will phase-segregate from concentrated aqueous salts of sodium, which this will not occur if acetonitrile is used in the place of isopropyl alcohol. A proper selection of the cosolvents and the salt will result in a single-phase solution.

CuHCF was synthesized as reported previously. An aqueous solution of $Cu(NO_3)_2$, and a second aqueous solution of $K_3Fe(CN)_6$ were added to water by simultaneous, dropwise addition while stirring. The final concentrations of the precursors were 40 mM $Cu(NO_3)_2$ and 20 mM $K_3Fe(CN)_6$.

A solid, brown precipitate formed immediately. It was filtered or centrifuged, washed, and dried. In a prior study, CuHCF synthesized by this method was found to have the composition $K_{0.7}Cu[Fe(CN)_6]_{0.7} \cdot 2.8H_2O$. The CuHCF was found to have the cubic Prussian Blue open framework crystal structure using X-ray diffraction (XRD). The CuHCF was composed of nanoparticles about 50 nm in size, as verified by scanning electron microscope (SEM).

MnHCMn was produced state by adding a 10 mL aqueous solution containing 0.0092 mmol KCN to a 10 mL aqueous solution containing 0.004 mmol $MnCl_2 \cdot 4H_2O$ under constant stirring in the dark in a nitrogen atmosphere. After stirring the solution for 20 minutes, the resulting dark green precipitate was centrifuged, washed with methanol, and dried at room temperature in a nitrogen atmosphere. Analysis of this material using X-ray diffraction showed that it had the monoclinic crystal structure characteristic of MnHCMn (II) synthesized by a similar method (Reference Number 24). Composition analysis using inductively coupled plasma optical emission spectrometry (ICP-OES) revealed that this material was $K_{0.4}Mn[Mn(CN)_6]_{0.6} \cdot nH_2O$ (0<n<4).

Aqueous cosolvent electrolytes were prepared from reagent-grade $NaClO_4 \cdot H_2O$, de-ionized water, and reagent grade MeCN. All electrolytes were pH-neutral, but not buffered. The salt was dissolved in a concentration of 1 M in cosolvents with solvent volume ratios of 100%/0%, 90%/10%, 50%/50%, 10%/90%, and 0%/100% water/MeCN.

Electrodes containing the freshly synthesized TMCCCs were prepared as reported previously. The electrochemically active material, carbon black, and polyvinylidene difluoride (PVDF) binder were ground by hand until homogeneous, and then stirred in 1-methyl-2-pyrrolidinone (NMP) solvent for several hours. This slurry was deposited on an electronically conductive carbon cloth substrate using a doctor blade or spatula. Other substrates including foils and meshes of stainless steel and aluminum can also be used. These electrodes were dried in vacuum at 60° C. For practical batteries, the binder is preferably selected such that it is stable against dissolution or excessive swelling in the cosolvent electrolyte, but is still fully wetted by the cosolvent. Methods for determining binder/electrolyte compatibilities such as Hansen Solubility Parameter analysis are well known.

Activated charcoal counter electrodes were prepared by grinding the charcoal with PVDF before stirring in NMP for several hours, followed by deposition and drying on conductive substrates following the same procedure as in the case of electrodes containing a TMCCC.

Electrochemical Characterization

Half-cell measurements were performed on TMCCC electrodes in cosolvent electrolytes. The cell contained the working electrode, a Ag/AgCl reference electrode, an activated charcoal counter electrode, and the deaerated electrolyte. Cyclic voltammetry was performed on the working electrode.

EXAMPLE 1

A MnHCMn electrode was disposed in a half cell in the configuration described above and operated by cyclic voltammetry. The reaction potentials of the reactions of MnHCMn with 1 M $Na^+$ were found to be about −0.76 V and 0.04 V vs. SHE. The potential of the lower reaction of MnHCMn varied only slightly with the addition of MeCN to the electrolyte, from 0% MeCN to 95% MeCN (FIG. 3-4). The magnitude and sign of the small shift in reaction potential showed no trend with MeCN concentration (FIG. 3).). Furthermore, MnHCMn was found to cycle reversibly in 95% MeCN at with $Na^+$ salt concentrations of both 1 M and 1.4 M.

EXAMPLE 2

A MnHCMn electrode was disposed in a half cell in the configuration described above and operated by cyclic voltammetry. MnHCMn was found to cycle reversibly in cosolvent electrolytes containing water as a minority cosolvent comprising 5% of the total solvent volume, and with equal quantities of MeCN and a second organic cosolvent comprising the remaining 95% of the total solvent volume (FIG. 5-6). These second organic cosolvents were one of: sulfolane, propylene glycol monoethyl ether, hydroxypropionitrile, gamma-valerolactone, ethylene carbonate, dimethyl carbonate, and 1,3-dioxolane. In these example electrolytes, the solvent volume of MeCN is as little as 10%, with another primary organic cosolvent such as propylene carbonate comprising 85% solvent volume. These electrolyte compositions of matter demonstrate the use of multiple organic cosolvents in combination with water as a minority cosolvent.

EXAMPLE 3

A MnHCMn electrode was disposed in a half cell in the configuration described above and operated by cyclic voltammetry. Over 55 mAh/g of specific discharge capacity was achieved for the lower reaction of MnHCMn in a cosolvent electrolyte of 1 M $NaClO_4$ in 90% MeCN and 10% water (FIG. 7) This is comparable to the 50-60 mAh/g capacities typically achieved for the upper reaction of MnHCMn at 0.05 V in aqueous electrolytes. With no loss in specific capacity of the anode, but a gain in full cell voltage of about 0.8 V, full cells that operate by using the lower reaction of MnHCMn will have nearly double the energy of those that operate by using the upper reaction of MnHCMn, with the same electrode materials (and associated costs). This makes the use of the lower reaction, and therefore, the use of a cosolvent electrolyte, critically important to the economics and viability of the battery.

EXAMPLE 4

A CuHCF electrode was disposed in a half cell in the configuration described above and operated by cyclic voltammetry. The half cells contained electrolytes of 1 M $NaClO_4$ and quantities of water and acetone up to 90% acetone. During cyclic voltammetry the reaction potential of CuHCF with 1 M $Na^+$ was observed to be centered at 0.84 V vs. SHE, which is consistent with the previously observed value (FIG. 8). The reaction potential and peak current hysteresis of CuHCF during CV varied only slightly, 1 M $NaClO_4$ cosolvents containing increasing amounts of acetone up to 90% of the total solvent volume.

EXAMPLE 5

A MnHCMn electrode was disposed in a half cell in the configuration described above and operated by cyclic voltammetry. In this example, the half cell contained an electrolyte of pure MeCN and no water, and 1 M NaClO4. A much lower peak current of MnHCMn was observed in MeCN electrolyte without water added as a minority cosolvent (FIG. 9). In contrast, the CV curves shown in FIG. 3, FIG. 4, and FIG. 8 show that there is little change in the voltage difference between the peak currents in oxidation and reduction. This qualitatively indicates that the kinetics of the reaction of both MnHCMn and CuHCF with $Na^+$ do not change in the presence of MeCN, up to the case of a 95% MeCN primary solvent. This example demonstrates that a minimum amount of water must be present in the cosolvent electrolyte to allow reversible electrode cycling that yields useful discharge capacity.

EXAMPLE 6

A MnHCMn electrode was disposed in a half cell in the configuration described above and operated by cyclic voltammetry. In this example, the half cell contained an electrolyte of either pure water with no organic cosolvents and 1 M $NaClO_4$, or of 95% solvent volume basis MeCN, with 5% solvent volume basis water and 1 M or 1.4 M $NaClO_4$ (FIG. 4). The background current observed at −0.9 V vs. S.H.E. was approximately 1 mA in the aqueous electrolyte containing no organic cosolvents. In the 95% volume basis MeCN electrolytes, the background current at −0.9 V vs. S.H.E. was less than 0.1 mA. Background current during a cyclic voltammetry scan indicates a side reaction such as the decomposition of water that harms coulombic efficiency. This example demonstrates that the addition of a majority organic cosolvent results in an improvement in the coulombic efficiency of the MnHCMn anode.

EXAMPLE 7

A MnHCMn electrode was disposed in a half cell in the configuration described above and operated by galvanostatic cycling at a 1 C rate between −0.9 V and −0.6 V vs. S.H.E. In aqueous 1 M $NaClO_4$ containing no organic cosolvents, the MnHCMn electrode lost 25% of its initial specific discharge capacity after 15 cycles (FIG. 10). However, in a cosolvent electrolyte of 1 M $NaClO_4$ containing 90% solvent volume MeCN and 10% solvent volume water as a minority cosolvent, less than 5% capacity loss was observed after 15 cycles. This demonstrates that the use of an organic cosolvent as the majority cosolvent solvent and water as a minority cosolvent significantly increases the cycle lifetime of the MnHCMn anode.

EXAMPLE 8

A MnHCMn electrode was disposed in a half cell in the configuration described above and operated by galvanostatic cycling at a 1 C rate between −0.9 V and −0.5 V vs. S.H.E. In aqueous 1 M $NaClO_4$ containing no organic cosolvents, the MnHCMn electrode had an initial discharge capacity of about 40 mAh/g. In 1 M NaClO4 containing 90% solvent volume MeCN and 10% solvent volume water as a minority cosolvent, a specific discharge capacity of about 55 mAh/g was achieved. This demonstrates that the use of the organic primary cosolvent prevents the decomposition of MnHCMn that can result in significant, immediate capacity loss.

EXAMPLE 9

A MnHCMn electrode was disposed in a half cell in the configuration described above and operated by galvanostatic cycling at a 1 C rate between −0.95 V and −0.5 V vs. S.H.E. In aqueous 1 M $NaClO_4$ containing no organic cosolvents, the MnHCMn electrode had coulombic efficiency of less than 99% (FIG. 12). In 1.4 M $NaClO_4$ containing 95% solvent volume MeCN and 5% solvent volume water as a minority cosolvent, a coulombic efficiency of over 99.5% was achieved in three identical cells.

EXAMPLE 10

A CuHCF electrode was disposed in a half cell in the configuration described above and operated by galvanostatic cycling at a 1 C rate. CuHCF loses 4% of its initial capacity after 50 cycles at a 1 C rate in aqueous 1 M $NaClO_4$ (FIG. 13). In contrast, CuHCF is completely stable and shows zero capacity loss after 300 cycles when operated in an electrolyte of 1 M $NaClO_4$ containing 90% solvent volume MeCN as the primary cosolvent and 10% solvent volume water.

EXAMPLE 11

In this example, MnHCMn and CuHCF electrodes were disposed as anode and cathode, respectively, in a full cell also containing a reference electrode as described above. The electrolyte was 1 M $NaClO_4$ in 90% solvent volume MeCN and 10% solvent volume water. These full cells were operated such that the anode was controlled by the reference electrode as the working electrode. The cathode was oversized such that the capacity of the anode limited the capacity of the full cell. The MnHCMn anode was galvanostatically cycled at 1 C as the working electrode between −0.9 V and −0.5 V vs. SHE. Highly reversible cycling of the full cell is achieved in this primarily organic cosolvent electrolyte (FIG. 14). Negligible capacity loss of either the CuHCF cathode or the MnHCMn anode was observed for 30 cycles, as shown by the consistent duration of each cycle shown in FIG. 13. This full cell operates at an average voltage of 1.7 V, nearly double that of the 0.9 V cell achievable if the upper reaction of MnHCMn is used (FIG. 1, FIG. 7, and FIG. 15). As the electrode materials in these two cells are identical, and only their mode of operation is changed, the higher voltage cell offers nearly twice the energy at the same materials cost. On a basis of the masses and densities of two TMCCC electrodes, a 1.7 V cell will have a specific energy of 50 Wh/kg and an energy density of 90 Wh/L.

FIG. 16 illustrates a representative secondary electrochemical cell 1600 schematic having one or more TMCCC electrodes disposed in contact with a cosolvent electrolyte as described herein. Cell 1600 includes a negative electrode 1605, a positive electrode 1610 and an electrolyte 1615 electrically communicated to the electrodes. One or both of negative electrode 1605 and positive electrode 1610 include TMCCC as an electrochemically active material. A negative current collector 1620 including an electrically conductive material conducts electrons between negative electrode 1605 and a first cell terminal (not shown). A positive current collector 1625 including an electrically conductive material conducts electrons between positive electrode 1610 and a second cell terminal (not shown). These current collectors permit cell 1600 to provide electrical current to an external circuit or to receive electrical current/energy from an external circuit during recharging. In an actual implementation, all components of cell 1600 are appropriately enclosed, such as within a protective housing with current collectors externally accessible. There are many different options for the format and arrangement of the components across a wide range of actual implementations, including aggregation of multiple cells into a battery among other uses and applications.

Electrolyte 1615, depending upon implementation, includes a set of conditions that affect production of hydrogen and oxygen gas responsive to the operating voltages of the electrodes. In general, at a first electrode voltage V1 relative to a reference electrode, initiation of more than an incidental quantity of hydrogen gas will begin to be produced at a particular rate R1 that is consequential for the particular application. Pure water, under comparable conditions, begins the production of hydrogen gas at rate R1 using a second electrode voltage V2 that is greater than V1 (as shown in FIG. 1, this voltage is less negative). Cell 1600 may be operated at an electrode voltage less than V2 but greater than V1 to achieve a greater cell voltage between the electrodes while producing hydrogen gas at second rate R2 less than R1.

REFERENCES (The following references are expressly incorporated by reference thereto in their entireties for all purposes. These are the references that are cited throughout the preceding content.)
1. Rastler, D. *Electricity Energy Storage Technology Options*, Electric Power Research Institute, 1020676 (2010).
2. Wessells, C. D., et al. Copper hexacyanoferrate battery electrodes with long cycle life and high power. *Nature Comm.*, 2, 550 (2011).
3. Wessells, C. D., et al. Nickel Hexacyanoferrate Nanoparticle Electrodes for Aqueous Sodium and Potassium Ion Batteries. *Nano Lett.*, 11, 5421 (2011).
4. Wessells, C. D., et al. The Effect of Insertion Species on Nanostructured Open Framework Hexacyanoferrate Battery Electrodes. *J. Electrochem. Soc.*, 159, A98 (2012).
5. Wessells, C. D., et al. Tunable Reaction Potentials in Open Framework Nanoparticle Battery Electrodes for Grid-Scale Energy Storage. *ACS Nano*, 6, 1688 (2012).
6. Pasta, M., et al. A high-rate and long cycle life aqueous electrolyte battery for grid-scale energy storage. *Nature Comm.*, 3, 1149 (2012).
7. Wessells, C. D., et al. High Rate, Long Cycle Life Battery Electrode Materials With An Open Framework Structure. US Patent Application US 2012/0328936 A1.
8. Scholz, F., et al. The Formal Potentials of Solid Metal Hexacyanometalates. *Angew. Chem. Int. Ed. Engl.*, 34, 2685 (1995).
9. López-Cueto, G., et al. Fast disproportionation of hexacyanomanganate(III) in acidic solution. Formation of hexacyanomanganate(IV) and kinetics of its decomposition. *Can. J. Chem.*, 64, 2301 (1986).
10. Buser, H. J., et al. The Crystal Structure of Prussian Blue: $Fe_4[Fe(CN)_6]_3 \cdot xH_2O$. *Inorg. Chem.*, 16, 2704 (1977).
11. Itaya, K., et al. Electrochemistry of Polynuclear Transition Metal Cyanides: Prussian Blue and Its Analogues. *Acc. Chem. Res.*, 19, 162 (1986).
12. Messina, R., Perichon, J., and Broussely, M. Mécanismes de la réduction électrochimique en milieu non aqueux de materiaux cathodiques utilizes dans les piles au lithium. IV. Réduction d'électrodes membranaires d'hexacyanoferrates (II et III) d'argent dans le mélange carbonate de propylene-1,2-diméthoxyéthane. *J. Appl. Electrochem.*, 9, 677 (1979).
13. Messina, R., and Perichon, J. Mécanisme de la réduction électrochimique en milieu non aqueux de materiaux cathodiques utilizes dan les piles au lithium. V. Utilisation des hexacyanoferrates de fer (II et III) comme materiaux cathodiques reversibles. *J. Appl. Electrochem.*, 10, 655 (1980).
14. Neff, V. D. Some Performance Characteristics of a Prussian Blue Battery. *J. Electrochem. Soc.*, 132, 1382 (1985).
15. Honda, K. and Hayashi, H. Prussian Blue Containing Nafion Composite Film as Rechareable Battery. *J. Electrochem. Soc.*, 134, 1339 (1987).
16. Grabner, E. W., and Kalwellis-Mohn, S. Hexacyanoferrate layers as electrodes for secondary cells. *J. Appl. Electrochem.*, 17, 653 (1987).
17. Kaneko, M., and Okada, T. A secondary battery composed of multilayer Prussian Blue and its reaction characteristics. *J. Electroanal. Chem.*, 255, 45 (1988).
18. Kalwellis-Mohn, S., and Grabner, E. W. A Secondary Cell Based on Thin Film Layers of Zeolite-Like Nickel Hexacyanometallates. *Electrochim. Acta.*, 34, 1265 (1989).
19. Jayalakshmi, M., and Scholz, F. Charge-discharge characteristics of a solid-state Prussian blue secondary cell. *J. Power Sources*, 87, 212 (2000).
20. Jayalakshmi, M., and Sholz, F. Performance characteristics of zinc hexacyanoferrate/Prussian blue and copper hexacyanoferrate/Prussian blue solid state secondary cells. *J. Power Sources*, 91, 217 (2000).
21. Itaya, K., et al. European Patent Application EP 0086555A1 (Jan. 13, 1983).
22. Eftekhari, A. Fabrication of all-solid-state thin-film secondary cells using hexacyanometalate-based electrode materials. *J. Power Sources*, 132, 291 (2004).
23. Okubo, M., et al. Switching Redox-Active Sites by Valence Tautomerism in Prussian Blue Analaogues $A_xMn_y[Fe(CN)_6] \cdot nH_2O$ (A: K, Rb): Robust Frameworks for Reversible Li Storage. *J. Phys. Chem. Lett.*, 1, 2063 (2010).
24. Asakura, D., et al. Fabrication of a Cyanide-Bridged Coordination Polymer Electrode for Enhanced Electrochemical Ion Storage Ability. *J. Phys. Chem. C*, 116, 8364 (2012).

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A method for operating a rechargeable electrochemical half cell having a negative electrode disposed in a single phase liquid electrolyte having total quantity Q including at least a total quantity Q1 of water wherein Q1/Q is approximately 0.02 or greater, a total quantity Q2 of one or more cosolvents wherein $Q2/Q \geq 0.5$, and a total quantity Q3 of one or more salts, and wherein an electrolysis of the total quantity Q1 of water below a first potential V1 initiates a production of hydrogen gas at a first rate R1, comprising:

a) exchanging ions between the negative electrode and the liquid electrolyte at an electrode potential VE, VE>V1; and b) producing hydrogen gas at a second rate R2 less than R1 responsive to said electrode potential VE;

wherein said electrolysis of water in second electrolyte consisting of water and one or more salts below a second potential V2 initiates a production of hydrogen gas at the rate R1; and wherein VE<V2.

2. The method of claim 1 wherein the negative electrode includes an active electrochemical material of a transition metal cyanide coordination compound (TMCCC).

3. The method of claim 2 wherein said TMCCC material includes a composition having the general chemical formula $A_xP_y[R(CN)_{6-j}L_j]_z \cdot nH_2O$, wherein:

A includes one or more cations;

P includes one or more metal cations;

R includes one or more transition metal cations; and

L is a ligand substituted in the place of a $CN^-$ ligand; where $0 \leq x \leq 2$;

$0 < y \leq 4$;

$0 < z \leq 1$;

$0 \leq j \leq 6$; and $0 \leq n \leq 5$.

4. The method of claim 3 wherein:

said A cations include one or more cations selected from the group consisting of $Na^+$, $K^+$, $Li^+$, $NH^{4+}$, $Mg^{2+}$ $Ca^{2+}$ and combinations thereof;

said P metal cations include one or more metal cations selected from the group consisting of $Ti^{3+}$, $Ti^{4+}$, $V^{2+}$, $V^{3+}$, $Cr^{2+}$, $Cr^{3+}$, $Mn^{2+}$, $Mn^{3+}$, $Fe^{2+}$, $Fe^{3+}$, $Co^{2+}$, $Co^{3+}$, $Ni^{2+}$, $Cu^+$, $Cu^{2+}$, $Zn^{2+}$, $Al^{3+}$, $Sn^{2+}$, $In^{3+}$, or $Pb^{2+}$ and combinations thereof;

said R transition metal cations include one or more transition metal cations selected from the group consisting of $V^{2+}$, $V^{3+}$, $Cr^{2+}$, $Cr^{3+}$, $Mn^+$, $Mn^{2+}$, $Mn^{3+}$, $Fe^{2+}$, $Fe^{3+}$, $Co^{2+}$, $Co^{3+}$, $Ru^{2+}$, $Ru^{3+}$, $Os^{2+}$, $Os^{3+}$, $Ir^{2+}$, $Ir^{3+}$, $Pt^{2+}$, $Pt^{3+}$, and combinations thereof; and said L ligands include one or more ligands selected from the group consisting of CO (carbonyl), NO (nitrosyl), $Cl^-$, and combinations thereof.

* * * * *